(12) United States Patent
Dallan

(10) Patent No.: US 11,027,370 B2
(45) Date of Patent: Jun. 8, 2021

(54) APPARATUS AND METHOD FOR LASER OR PLASMA CUTTING OF PIECES OF LAMINAR MATERIAL WOUND IN COIL

(71) Applicant: DALLAN S.p.A., Castelfranco Veneto (IT)

(72) Inventor: Andrea Dallan, Castelfranco Veneto (IT)

(73) Assignee: DALLAN S.p.A., Castelfranco Veneto (IT)

( * ) Notice: Subject to any disclaimer, the term of this patent is extended or adjusted under 35 U.S.C. 154(b) by 277 days.

(21) Appl. No.: 16/153,278

(22) Filed: Oct. 5, 2018

(65) Prior Publication Data

US 2019/0105738 A1    Apr. 11, 2019

(30) Foreign Application Priority Data

Oct. 5, 2017    (IT) .................. 102017000111570

(51) Int. Cl.
*B23K 26/00* (2014.01)
*B23K 26/38* (2014.01)
(Continued)

(52) U.S. Cl.
CPC .............. *B23K 26/38* (2013.01); *B23K 10/00* (2013.01); *B23K 26/0838* (2013.01);
(Continued)

(58) Field of Classification Search
CPC ................ B23K 10/00; B23K 26/0838; B23K 26/0846; B23K 26/0869; B23K 26/16;
(Continued)

(56) References Cited

U.S. PATENT DOCUMENTS

2004/0108305 A1    6/2004 Harnisch et al.
2005/0224476 A1    10/2005 Ito et al.
(Continued)

FOREIGN PATENT DOCUMENTS

CN    105965271 A    9/2016
DE       10231032 A1    1/2004
(Continued)

*Primary Examiner* — Sang Y Paik

(74) *Attorney, Agent, or Firm* — Henry J. Cittone; Cittone Demers & Arneri, LLP

(57) ABSTRACT

A method and apparatus for laser or plasma cutting of pieces from laminar material wound in coil is provided. The apparatus provides a cutting station, with an operative cutting area and a receiving cavity, means for positioning and holding the laminar material suspended in the operative area above the receiving cavity during cutting operations, an electronic control unit and movable device for selective collection of the machined pieces. The electronic control unit controls the movement of the movable device between an active and a passive position so that that the movable device is in passive position when the cutting head is performing cutting operations generating swarf, letting such swarf to fall inside the cavity, and is in active position when the cutting head is performing cutting operations to detach pieces from the laminar material skeleton, to collect the pieces separately from the swarf and the skeleton.

28 Claims, 18 Drawing Sheets

(51) Int. Cl.
 *B23K 10/00* (2006.01)
 *B23K 26/08* (2014.01)
 *B23K 26/70* (2014.01)
 *B23K 26/16* (2006.01)
 *B23P 21/00* (2006.01)
 *B23P 25/00* (2006.01)

(52) U.S. Cl.
 CPC ...... *B23K 26/0846* (2013.01); *B23K 26/0869* (2013.01); *B23K 26/16* (2013.01); *B23K 26/702* (2015.10); *B23P 21/00* (2013.01); *B23P 25/003* (2013.01); *B23P 2700/12* (2013.01)

(58) Field of Classification Search
 CPC ....... B23K 26/38; B23K 26/702; B23P 21/00; B23P 25/003; B23P 2700/12
 USPC .......................................... 219/121.6–121.83
 See application file for complete search history.

(56) References Cited

U.S. PATENT DOCUMENTS

| | | | |
|---|---|---|---|
| 2010/0132526 | A1* | 6/2010 | Wahl .................. B23K 37/0461 83/152 |
| 2016/0288257 | A1* | 10/2016 | Deiss ................. B23K 26/0876 |
| 2016/0297036 | A1* | 10/2016 | Schmauder ........ B23K 37/0235 |
| 2016/0311069 | A1 | 10/2016 | Deiss |
| 2018/0079035 | A1* | 3/2018 | Watanabe .............. B23K 26/08 |
| 2018/0133838 | A1* | 5/2018 | Summerer .............. B23K 26/38 |
| 2019/0151998 | A1 | 5/2019 | Dallan |

FOREIGN PATENT DOCUMENTS

| | | |
|---|---|---|
| ES | 2604189 A1 | 1/2004 |
| IT | VI20 110 337 A1 | 6/2013 |

* cited by examiner

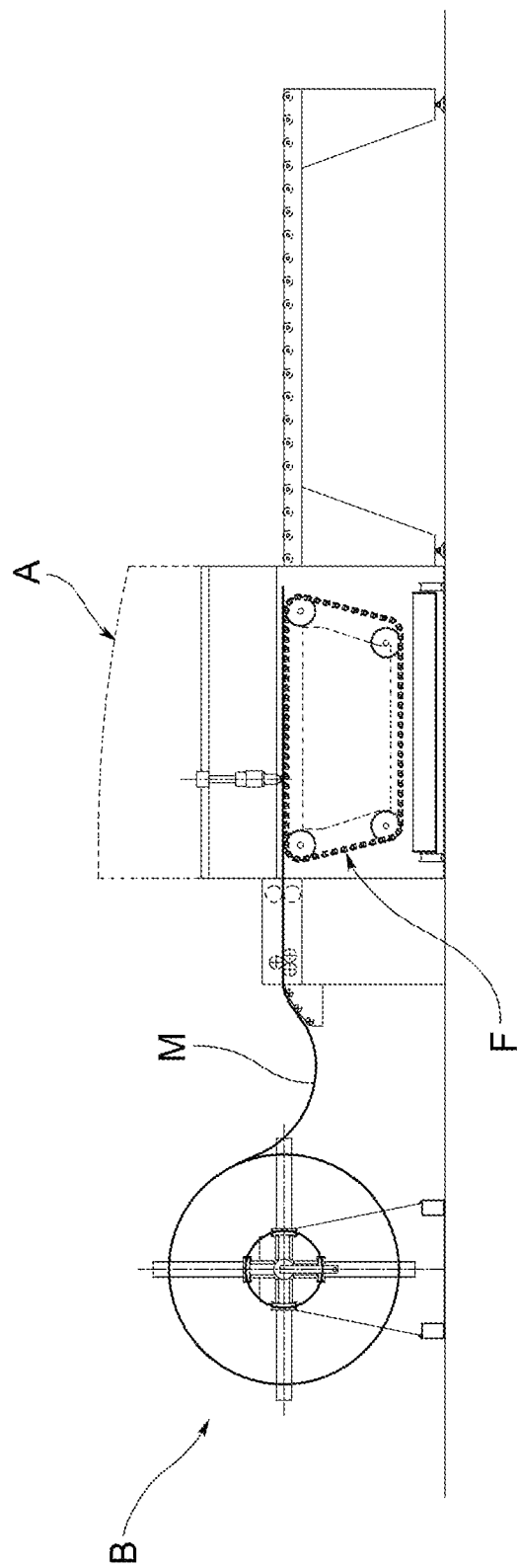
FIG.1 - Prior art
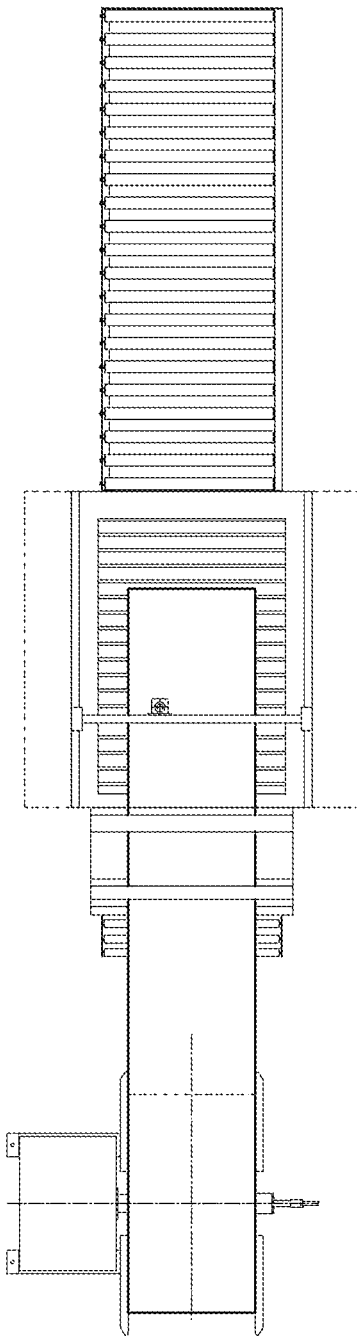
FIG.2 - Prior art

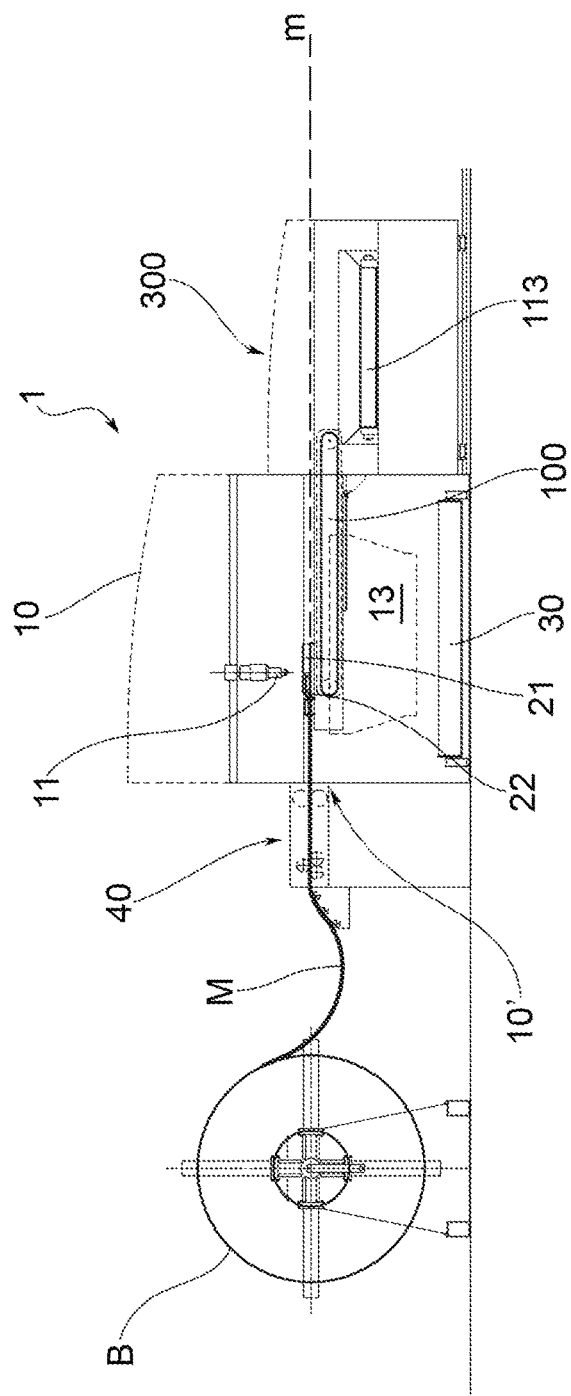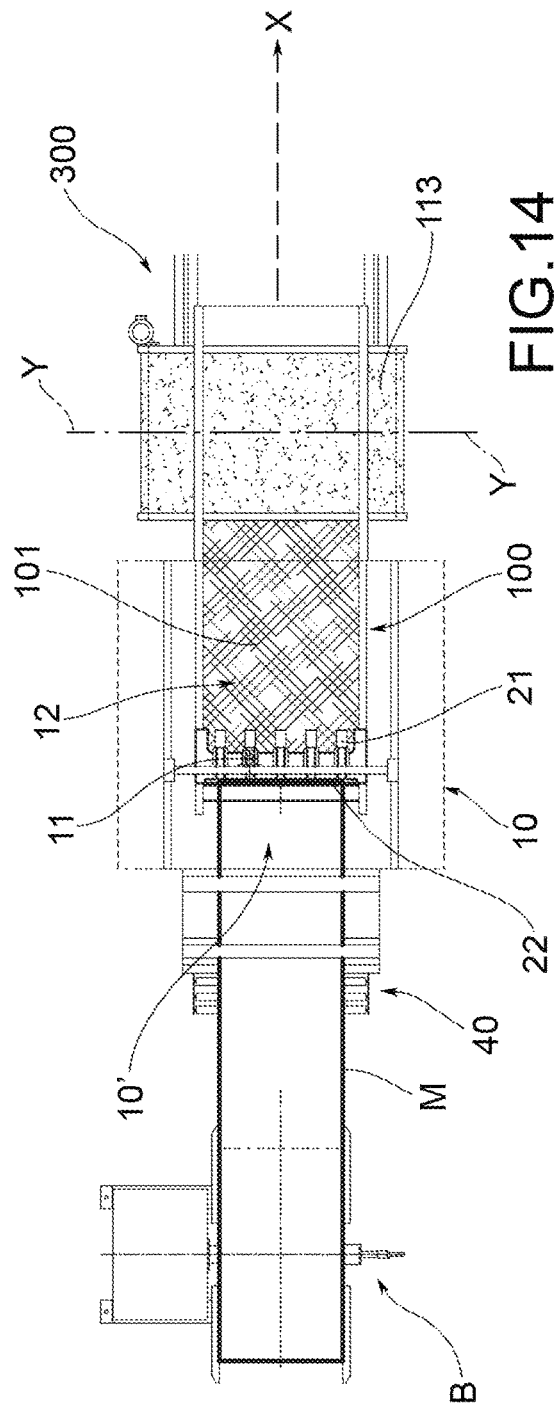

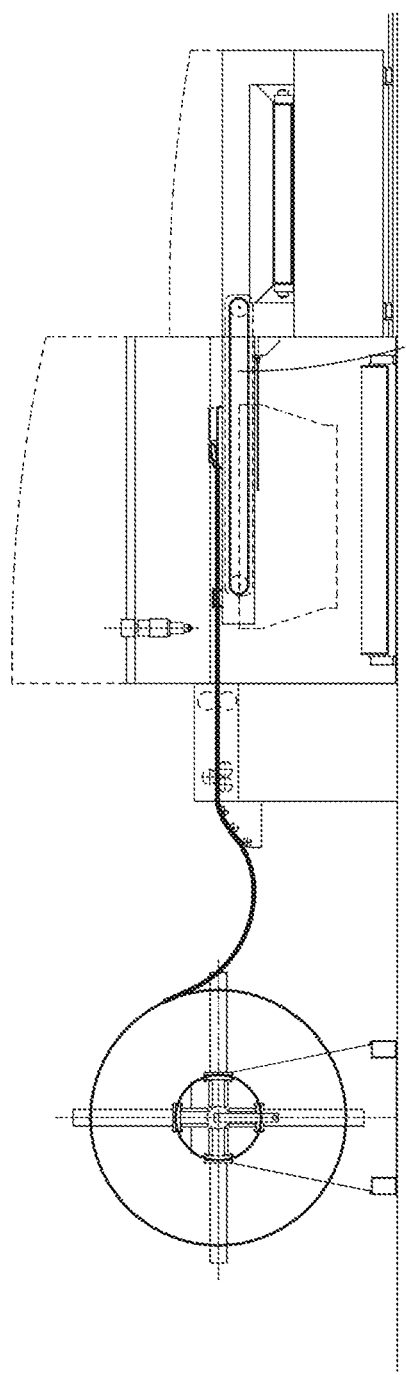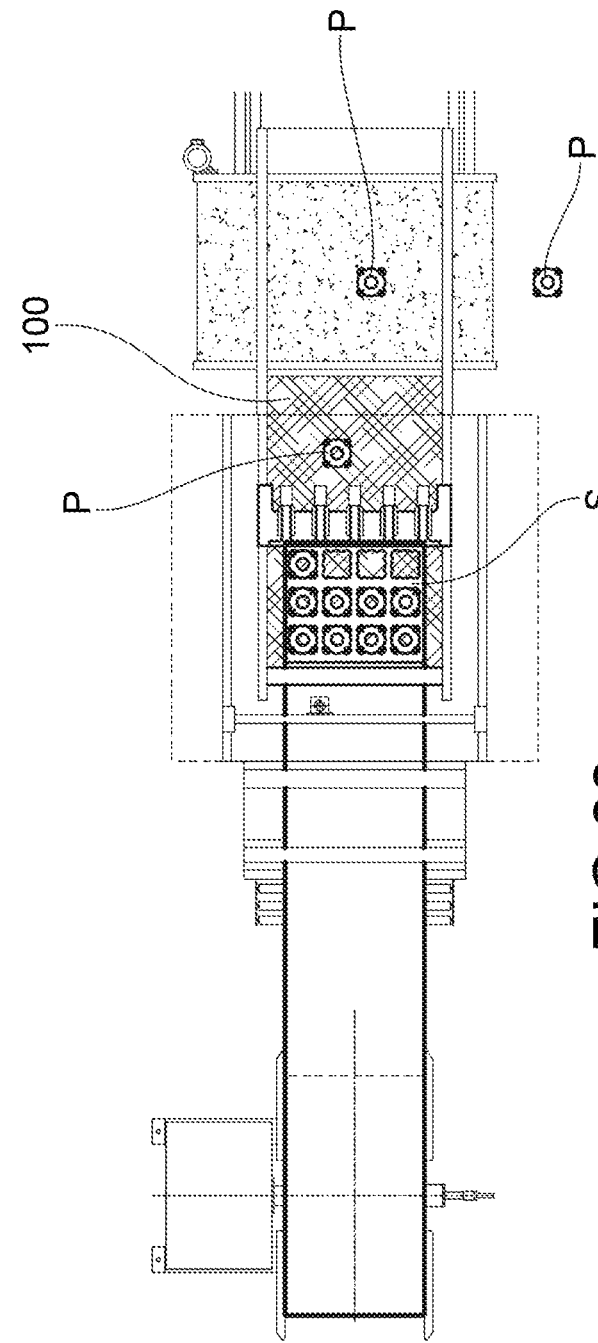

APPARATUS AND METHOD FOR LASER OR PLASMA CUTTING OF PIECES OF LAMINAR MATERIAL WOUND IN COIL

CROSS-REFERENCE TO RELATED APPLICATION

This application claims priority to Italian Pat. App. No. 102017000111570 filed on Oct. 5, 2017, the disclosures of which are hereby incorporated by reference in their entirety.

FIELD OF THE INVENTION

The object of the present invention is an apparatus and a method for laser or plasma cutting of pieces from laminar material wound in coil.

Advantageously, the apparatus and method according to the present invention are particularly suitable for cutting pieces that, because of their final use, must comply with high quality standards in terms of compliance with dimensional tolerances and be free of deformations and/or abrasions.

In particular, the apparatus and method according to the present invention are suitable, for example, for the production of gaskets for engine heads, components for applications in the field of microelectronics and components for the eyewear sector.

The laminar material that may be processed by the apparatus according to the invention may consist of normal metal sheet or stainless steel, aluminum, copper, brass, and in general all the materials that can normally be processed with laser or plasma cutting machines, coated and uncoated.

BACKGROUND

As is well known, in general, cutting pieces from laminar material wound in coil generates three types of components: the machined pieces; the machining swarf; and the residual laminar material, i.e. the laminar material emptied of the machined pieces and swarf. In the description provided hereinafter, the residual laminar material will be referred to more briefly as the "skeleton".

The separation of the machined pieces from the swarf and the skeleton may be done manually or be partially automated.

Devices for laser or plasma cutting of pieces of laminar material M wound in coil B (in particular, metal sheets) are known wherein, during the cutting step, the laminar material is placed on a movable support structure, consisting of a conveyor belt defined by rods positioned transverse to the advancing direction of the belt and spaced apart from each other. Each rod has a row of protruding spikes on which the laminar material rests. This type of conveyor belt is called a spike bed type (fakir's bed) type and prevents burning of the laminar material in the areas of contact between the material and the movable support. During the cutting step, the machining swarf (which is normally small or very small) slips into the empty spaces of the spike bed conveyor and is thus separated from the machined pieces and the skeleton during the cutting step. The swarf is thus already collected in the area below the cutting area, while the machined pieces and skeleton continue to travel together on the spike bed conveyor to be transported to a collection station downstream, outside the cutting area. An example of such apparatus is schematically illustrated in FIGS. 1 and 2, where the laser cutting station is indicated at A and the spike bed conveyor is indicated at F.

Generally, the machined pieces are kept connected to the skeleton by micro-joints, which are then cut downstream.

Alternatively, as described in the international application WO2009/105608A1, the pieces are already completely cut in the cutting station, leaving no micro-joints between the pieces and the skeleton. The machined pieces (completely disconnected from the skeleton) continue to travel on the spike bed conveyor to exit the cutting area along with the skeleton. Along the advancing direction of the laminar material, at the end of the spike bed conveyor, a discontinuity of the transport means is envisaged. In particular, it is provided that the collection belt intended to receive the machined laminar material when leaving the spike bed conveyor is spaced from the latter in the advancing direction. Once such discontinuity is reached, the machined pieces—no longer supported from below—may separate from the skeleton by simply falling, depositing themselves on another collection belt below, while the skeleton continues its run along the conveyor belt arranged downstream of the spike bed conveyor.

Apparatuses are also known for the laser or plasma cutting of pieces of laminar material wound in coil which do not use pin-type conveyor belts. During the cutting step, the laminar material is held stretched in the air without any lower support by means of slidable handling means. In his way the risk of burns on the material is eliminated. Operationally, the pieces are not fully cut, but rather micro-joints connecting to the skeleton remain. Once the cutting step in the suspended condition is finished, under the portion of pre-cut material (pieces connected to the skeleton by micro-joints) a support element is inserted consisting of a plurality of rods, parallel to the advancing direction of the material and spaced transversely. The pre-cut laminar material thus supported is extracted from the cutting area and carried to a collection area downstream. Once this collection area is reached, the portion of pre-cut material is separated from the rest of the material; the support element is then retracted, allowing the pre-cut material to lie on a collection plane arranged at a lower level than that defined by the movable support element and corresponding to the cutting plane. An example of such an apparatus is described in the Italian patent IT1409876.

None of the technical solutions described above make it possible to separate the machined pieces from the swarf and the skeleton directly in the machining area, but rather all require—downstream of the cutting area—an area for separating the machined pieces and the skeleton. This increases the dimensions of the device, to the detriment of the compactness thereof.

The Spanish patent application ES2604189A1 describes an apparatus for cutting pieces from laminar material wound in coil that allows the machined pieces to be separated from the skeleton directly in the cutting area. In the cutting area, the material to be machined is supported by a hatch support structure. During cutting, the hatch support structure is closed so as to support the material from underneath; once the pieces have been cut (completely disconnected from the skeleton), the hatch support structure is opened so as to let the machined pieces fall onto an underlying conveyor belt. The skeleton is thus taken out of the cutting area into a separate collection area arranged further downstream.

The apparatus described in ES2604189A1 is much more compact than the apparatus described previously but has two limitations. The first limitation is that the machined pieces are collected separately from the skeleton, but not from the machining swarf. In effect, when the hatch is opened, the swarf falls together with the machined pieces. The second limitation is related to the fact that the machined pieces may be deformed by falling onto the belt underneath the hatch. Due to the presence of the hatch, the lower collection belt may not be brought too close to the cutting plane so as not to limit the opening of the same hatch and the fall height cannot, therefore, be minimized.

There is, therefore, in the field a need for an apparatus for laser or plasma cutting of pieces from laminar material wound in coil which allows the machined pieces to be separated from both the swarf and the skeleton directly in the cutting area, to the benefit of the compactness of the apparatus.

There is moreover a need in the field to combine the separation of machined pieces from the swarf and the skeleton directly in the cutting area with a mode of collecting the machined pieces that minimizes the risk of deformations and/or abrasions of the machined pieces.

SUMMARY OF THE INVENTION

Therefore, the main object of the present invention is to eliminate, in whole or in part, the drawbacks of the above-cited prior art, by providing an apparatus for the laser or plasma cutting of pieces of laminar material wound in coil that allows the machined pieces to be separated from both the swarf and the skeleton directly in the cutting area.

A further object of the present invention is to provide an apparatus for the laser or plasma cutting of pieces from laminar material wound in coil that allows the separation of the machined pieces from the swarf and from the skeleton directly in the cutting area to be combined with a mode for collecting the machined pieces that minimizes the risk of deformations and/or abrasions of the same pieces.

A further object of the present invention is to provide an apparatus for the laser or plasma cutting of pieces of laminar material wound in coil that is easy to manage.

A further object of the present invention is to provide an apparatus for the laser or plasma cutting of pieces of laminar material wound in coil that is simple and economical to manufacture.

A further object of the present invention is that of providing a method for the laser or plasma cutting of pieces from laminar material wound in coil which allows the machined pieces to be separated from both the swarf and the skeleton directly in the cutting area, to the benefit of the compactness of the apparatus.

A further object of the present invention is to provide a method for the laser or plasma cutting of pieces from laminar material wound in coil that allows the separation of the machined pieces from the swarf and from the skeleton directly in the cutting area to be combined with a mode for collecting the machined pieces that minimizes the risk of deformations and/or abrasions of the same pieces.

BRIEF DESCRIPTION OF THE DRAWINGS

The technical features of the invention, according to the aforesaid objects, are clearly apparent from the content of the claims provided below and the advantages thereof will become more apparent in the following detailed description, made with reference to the accompanying drawings, which represent one or more purely exemplifying and non-limiting embodiments, wherein:

FIGS. 1 and 2 show two orthogonal schematic views, respectively in elevation and from above, of an apparatus of a known type for the laser or plasma cutting of pieces of laminar material wound in coil, equipped with a spike bed conveyor;

FIGS. 13 to 26 show schematically in sequence the different operational steps of the apparatus of FIG. 5, wherein each step is illustrated with a top view and a side view.

DETAILED DESCRIPTION

Figure 3:
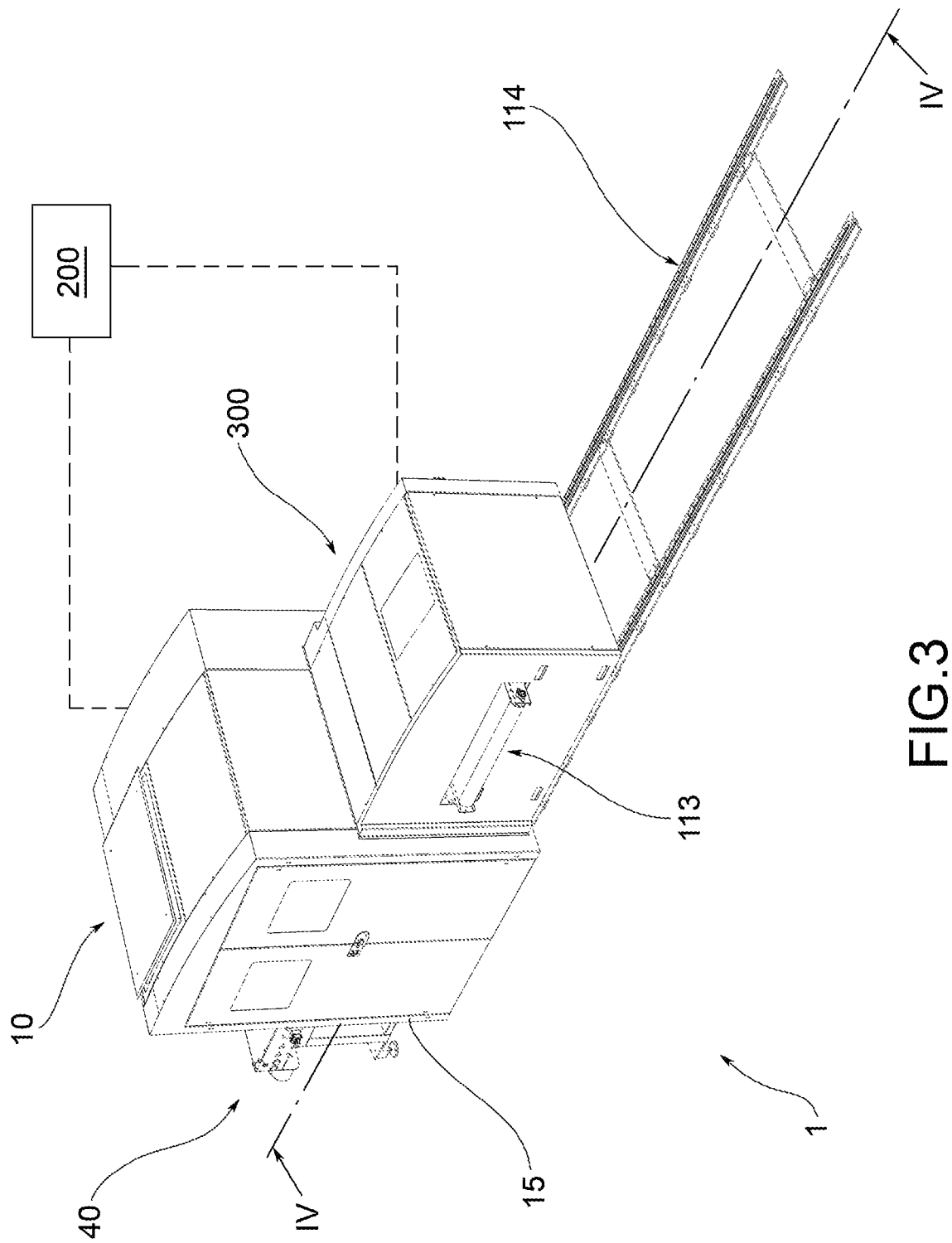
FIG. 3 shows a perspective view of an apparatus for the laser or plasma cutting of pieces of laminar material wound in coil according to one embodiment of the invention.

The apparatus for the laser or plasma cutting of pieces of laminar material wound in coil according to the invention shall be indicated collectively with 1 in the accompanying figures.

For sake of simplicity, the method of cutting according to the invention will be described after the apparatus, making reference to the latter.

Here and in the description and claims that follow, reference will be made to the apparatus 1 in the condition of use. It is in this sense that any references to a lower or upper position, or to a horizontal or vertical orientation, are therefore to be understood.

According to a general embodiment of the invention, the apparatus 1 comprises a cutting station 10, equipped with at least one laser or plasma cutting head 11 that is movable within an operative cutting area 12.

Such operative cutting area 12 is arranged downstream of an entrance 10' of the laminar material in the station 10 along a longitudinal advancing direction X of the material and is located above a receiving cavity 13 for the cutting swarf T of the laminar material.

Figure 4:
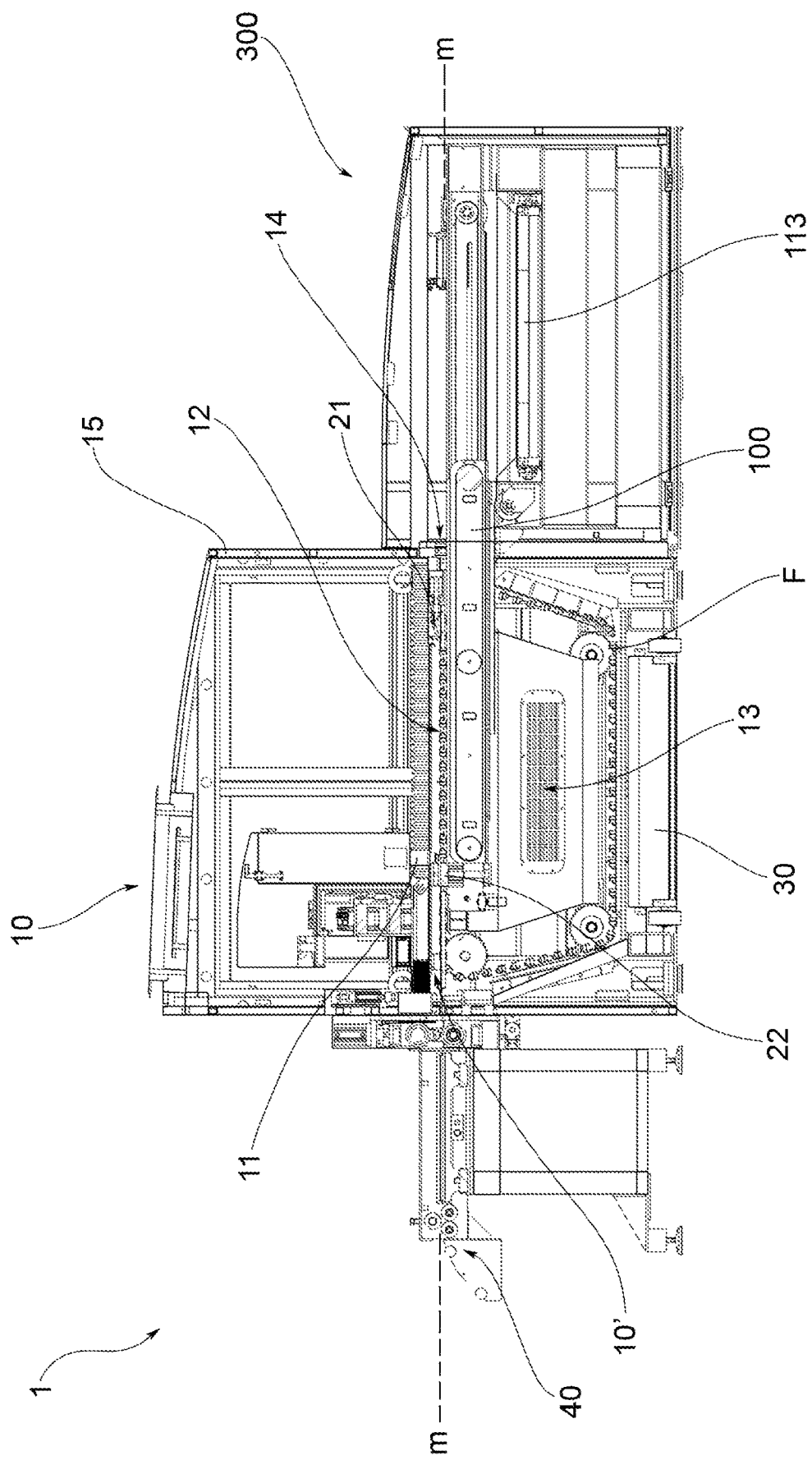
FIG. 4 shows a vertical sectional view of the apparatus in FIG. 3 according to a vertical sectional plane passing through the line IV-IV reported therein.
Figure 5:
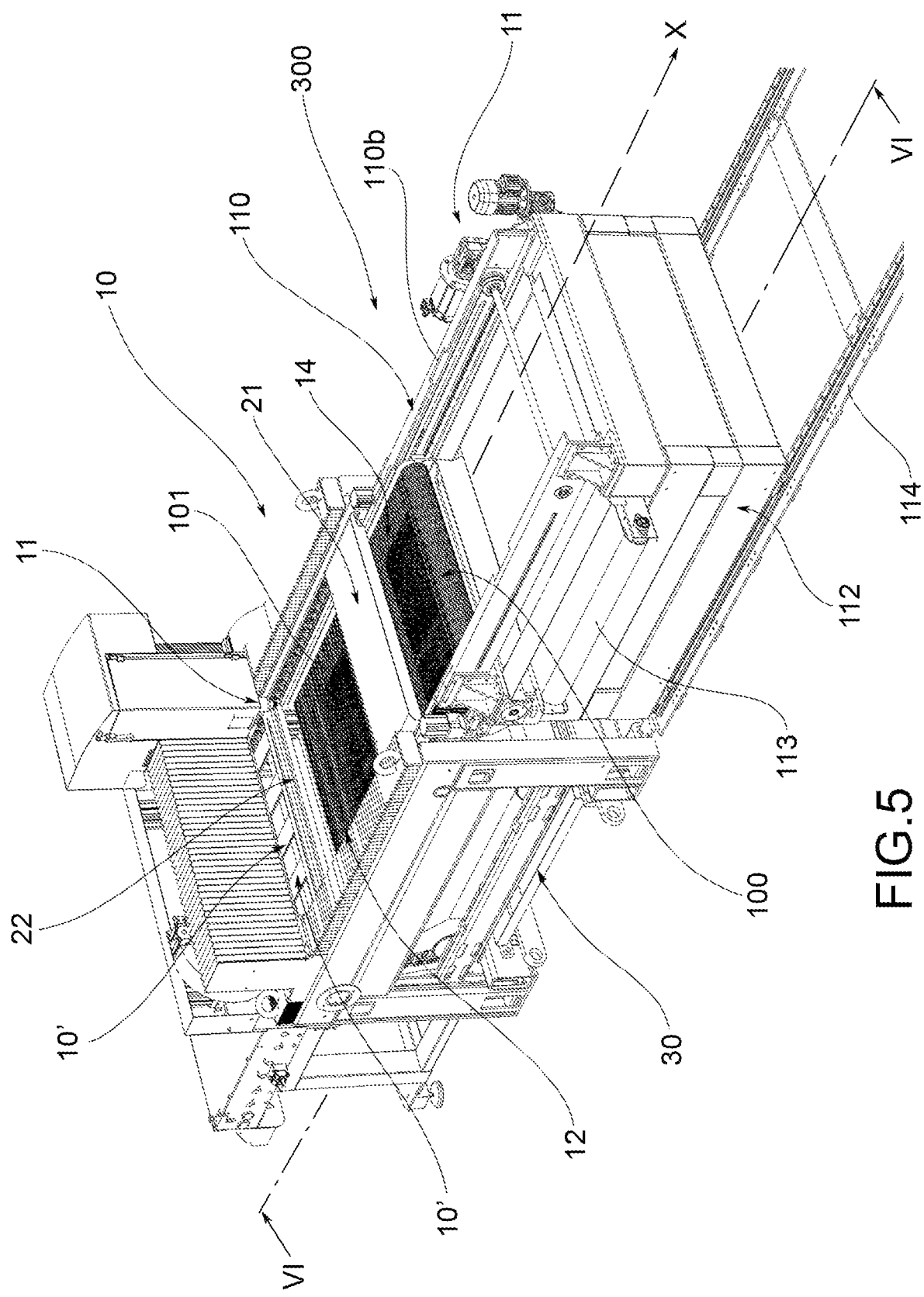
FIG. 5 shows a perspective view from above of the apparatus in FIG. 3, illustrated with some parts removed to better highlight others, and with a movable device for selective collection of machined pieces in an active operating position for collecting machined pieces in the operative cutting area of the apparatus.

As illustrated in FIGS. 3 and 4, the cutting station 10 is preferably equipped with perimeter walls 15, arranged as a protection and shield for the operative cutting area 12.

In particular, the cutting station 10 may be a traditional cutting station (for example, as described in the Italian patent IT1409876) and will not be described in detail, since it is well known to a person skilled in the art.

In particular, the cutting station 10 may comprise two or more laser or plasma cutting heads 11. Also, the handling means of the single cutting head 11 or of the plurality of cutting heads (if provided) are of the traditional type and thus will not be described in detail. In the case of a single cutting head, as shown in the accompanying figures, such handling means may consist, for example, of an overhead gantry, to which is associated the cutting head 11.

Advantageously, the cutting station 10 may also be a cutting station equipped with a spike bed conveyor. For use in the apparatus 1 according to the invention, such cutting station is stripped of the components forming the spike bed conveyor in such a way that no element is placed between the operative cutting area 12 and the underlying swarf receiving cavity 13. Advantageously, such cutting station may then be reconverted to traditional operation by reassembling the spike bed conveyor.

Advantageously, as illustrated in particular in FIGS. 4 and 13, the apparatus 1 may comprise, upstream of the entrance 10' to the cutting station 10, means 40 to guide and straighten on the cutting plane m the laminar material M originating from a coil B in the longitudinal advancing direction X of the material. Such means 40 are also known to a person skilled in the art and will not be described in detail.

The apparatus 1 comprises means 21, 22 for placing a portion of the laminar material M in the aforementioned operating area 12 on a cutting plane m arranged above the aforesaid receiving cavity 13.

Operationally, such positioning means 21, 22 are suitable to keep the portion of laminar material M blocked on the cutting plane m during the cutting operations, suspended in the air and longitudinally stretched over the aforementioned receiving cavity 13.

In accordance with a preferred embodiment of the present invention illustrated in the accompanying figures, the aforesaid positioning means comprise:

a support structure 110;

a movable gripping device 21, which is adapted to grip a transverse portion of the laminar material and is movable with respect to the aforesaid support structure 110 parallel to the longitudinal advancing direction X of the material to drag at least a portion of the laminar material from the entrance 10' inside the operative cutting area 12 on the cutting plane m; and a fixed reversible blocking device 22, which is associated with the support structure 21 to act transversely near the entrance 10' on the part of the laminar material arranged therein.

Operationally, the aforesaid reversible blocking device is operable in blocking, in conjunction with the movable gripping device 21, to stretch longitudinally the portion of the laminar material dragged by the movable gripping device 21 inside the operative cutting area 12.

In particular, the movable gripping device may consist of at least one vice 21 slidingly guided by the support structure 110 along the longitudinal direction X and wherein said fixed reversible blocking device may consist of at least one fixed vice 22.

In accordance with the embodiment illustrated in FIGS. 13 to 26, the movable gripping device consists of five vices 21 distributed along the transverse extension of the sliding lane of the laminar material and integral with each other in the translating movement along the axis X, while the fixed reversible blocking device consists of a single fixed vice 22, which substantially extends over the entire transverse extension of such lane.

In addition, the apparatus 1 comprises an electronic control unit 200, which is in charge of controlling the operation of the apparatus 1.

According to a first essential aspect of the invention, the apparatus 1 comprises at least one movable device 100 for selective collection of the machined pieces P.

Such movable device 100 defines a continuous surface 101 for collecting the machined pieces P. In other words, as will be clear from the following description, such movable device 100 is configured to hold the machined pieces P that detach from the skeleton S and fall from the cutting plane m downwards, regardless of the size thereof.

Figure 6:
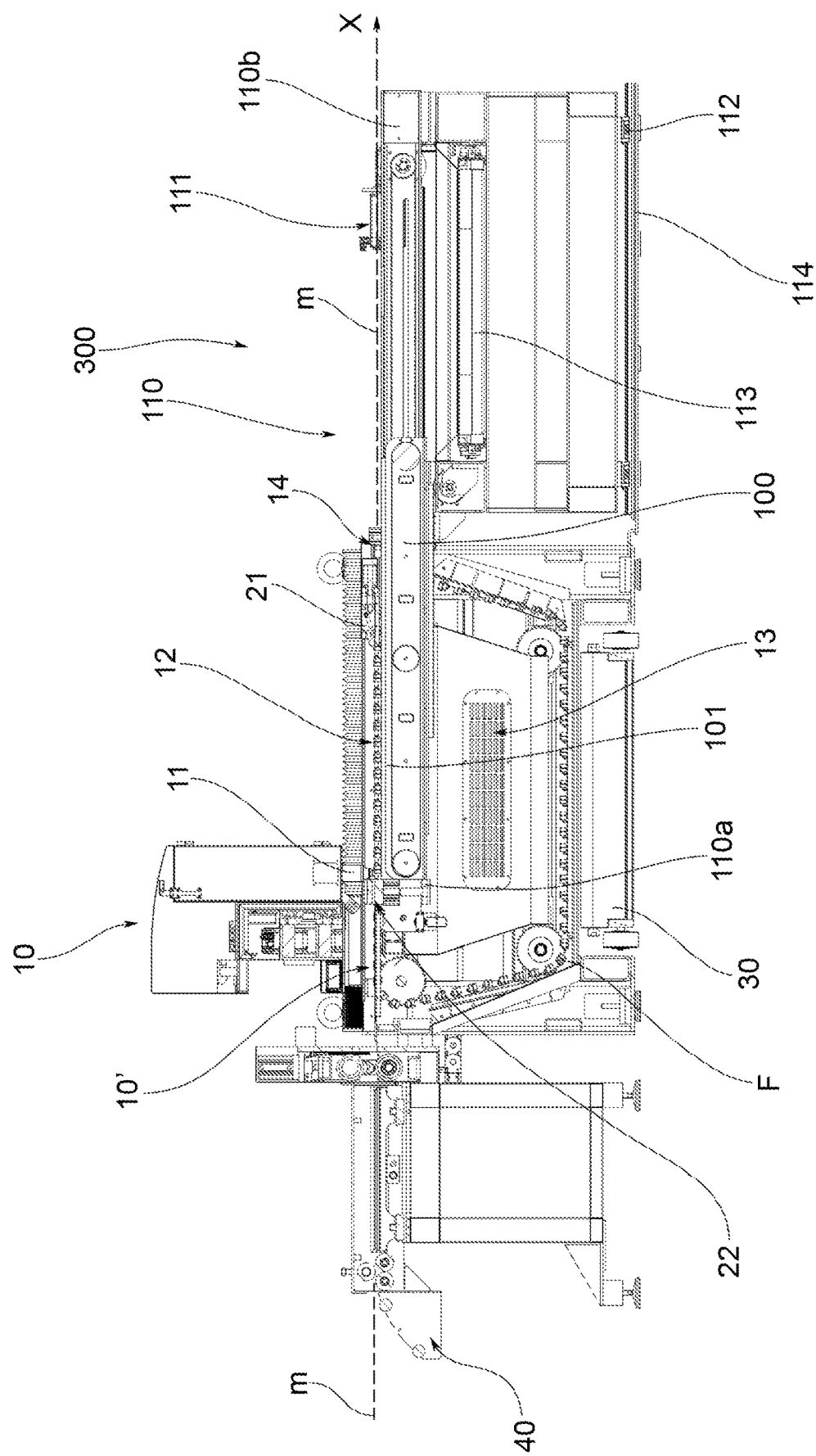
FIG. 6 shows a vertical sectional view of the apparatus in FIG. 5 according to a vertical sectional centerline plane passing through the line VI-VI reported therein.
Figure 7:
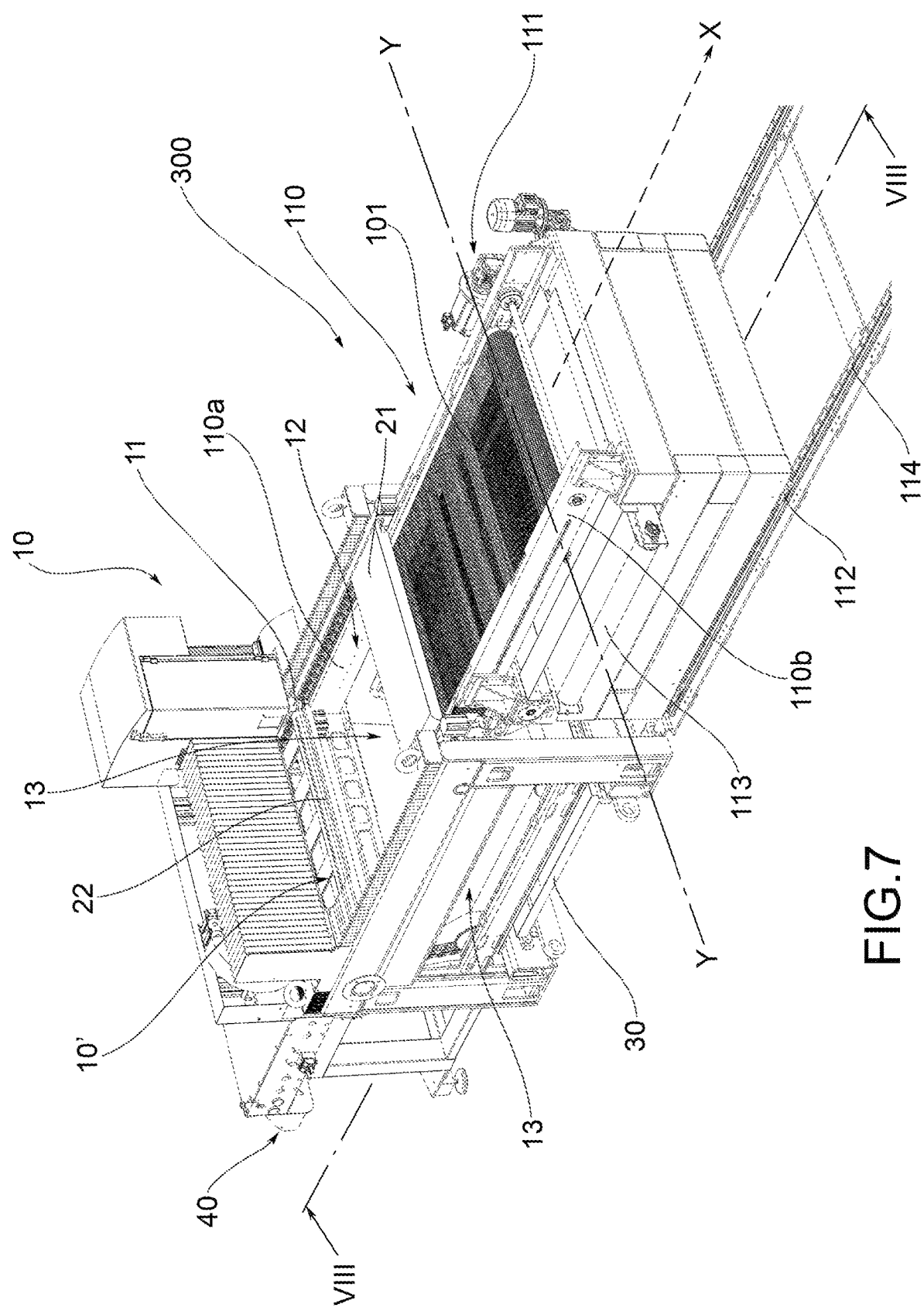
FIG. 7 shows a perspective view from above of the apparatus in FIG. 5, illustrated with a movable device for selective collection of machined pieces in a passive operating position external to the operative cutting area of the apparatus.
Figure 8:
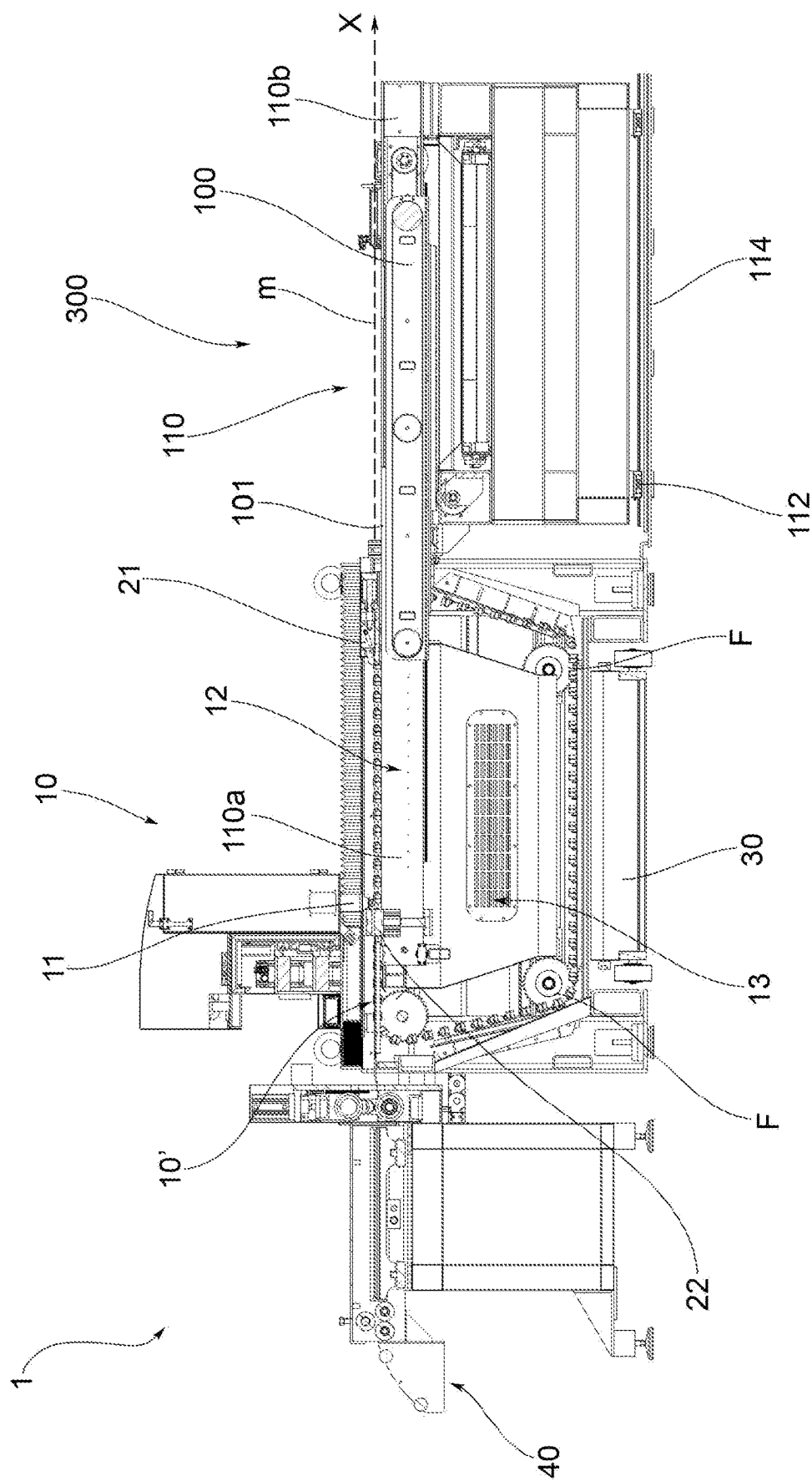
FIG. 8 shows a vertical sectional view of the apparatus in FIG. 7 according to a vertical sectional centerline plane passing through the line VIII-VIII reported therein.
Figure 9:
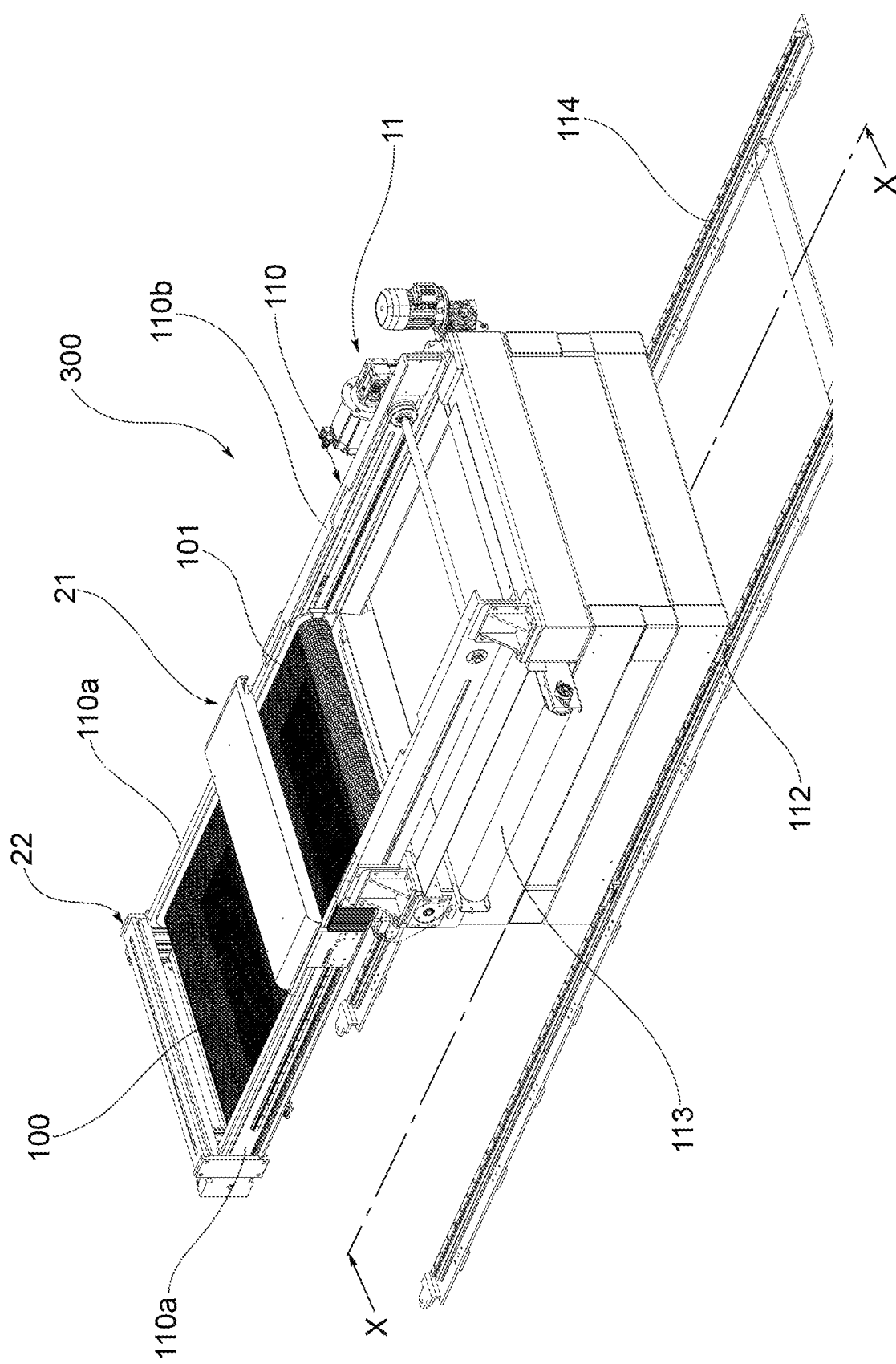
FIG. 9 shows a component of the apparatus illustrated in FIG. 5 relating to an operative unit separable from the cutting station illustrated separate from the rest of the apparatus and with a movable device for selective collection of machined pieces consisting of a conveyor belt, illustrated in an active operating position.
Figure 10:
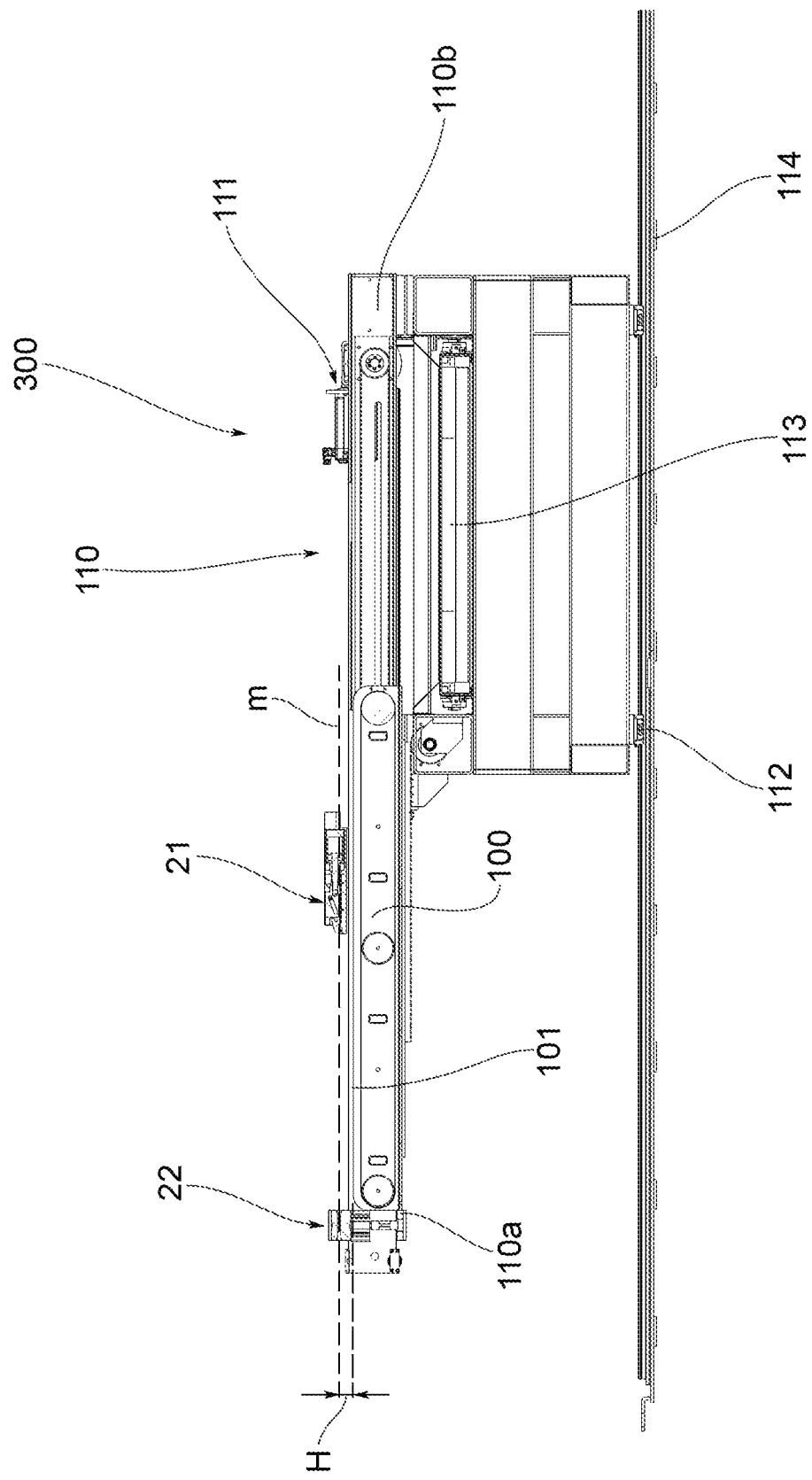
FIG. 10 shows a vertical sectional view of the device in FIG. 9 according to a vertical sectional centerline plane passing through the line X-X reported therein.
Figure 11:
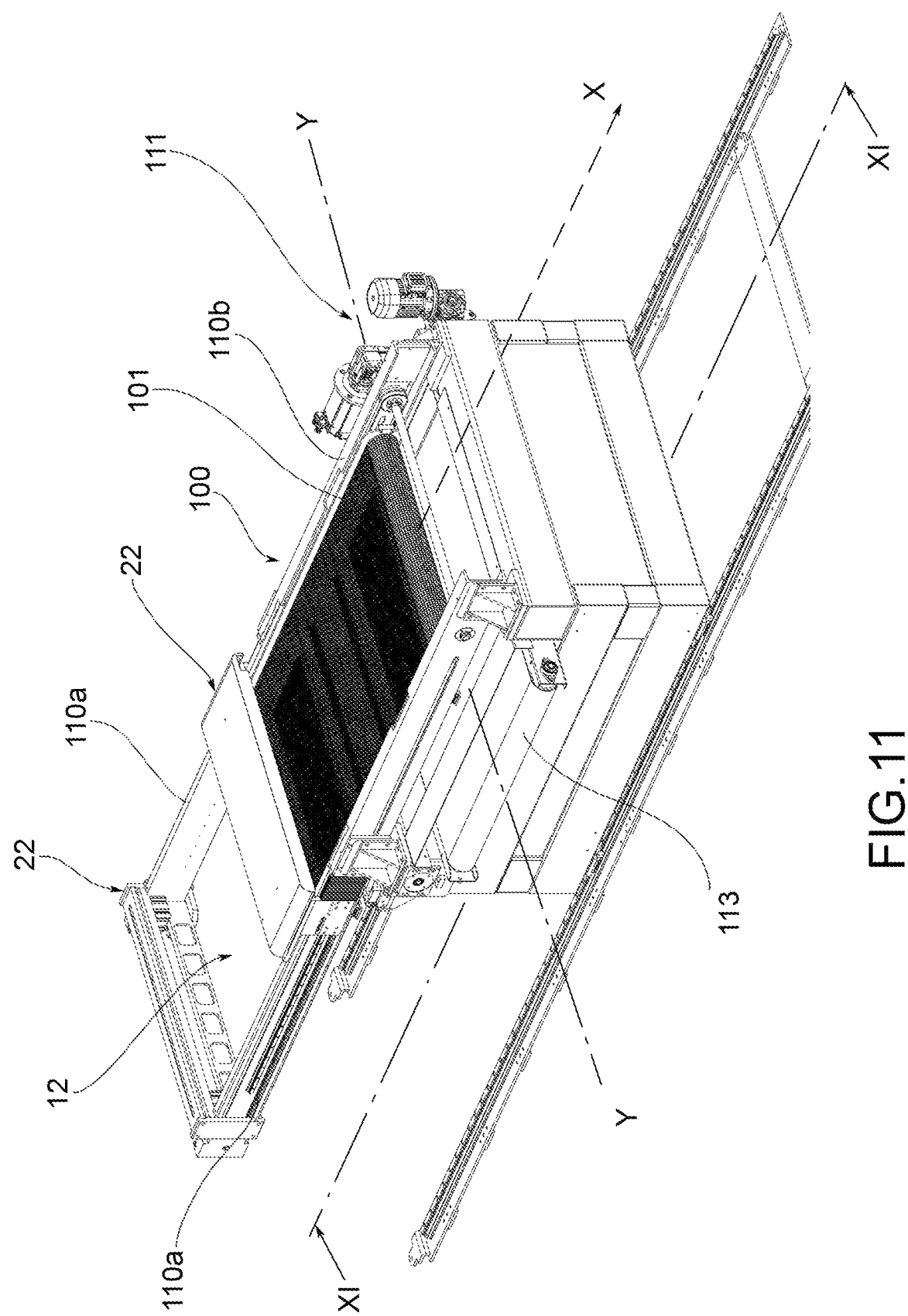
FIG. 11 shows the component in FIG. 9, illustrated with the movable device for selective collection of machined pieces consisting of a conveyor belt, illustrated in a passive operating position.
Figure 12:
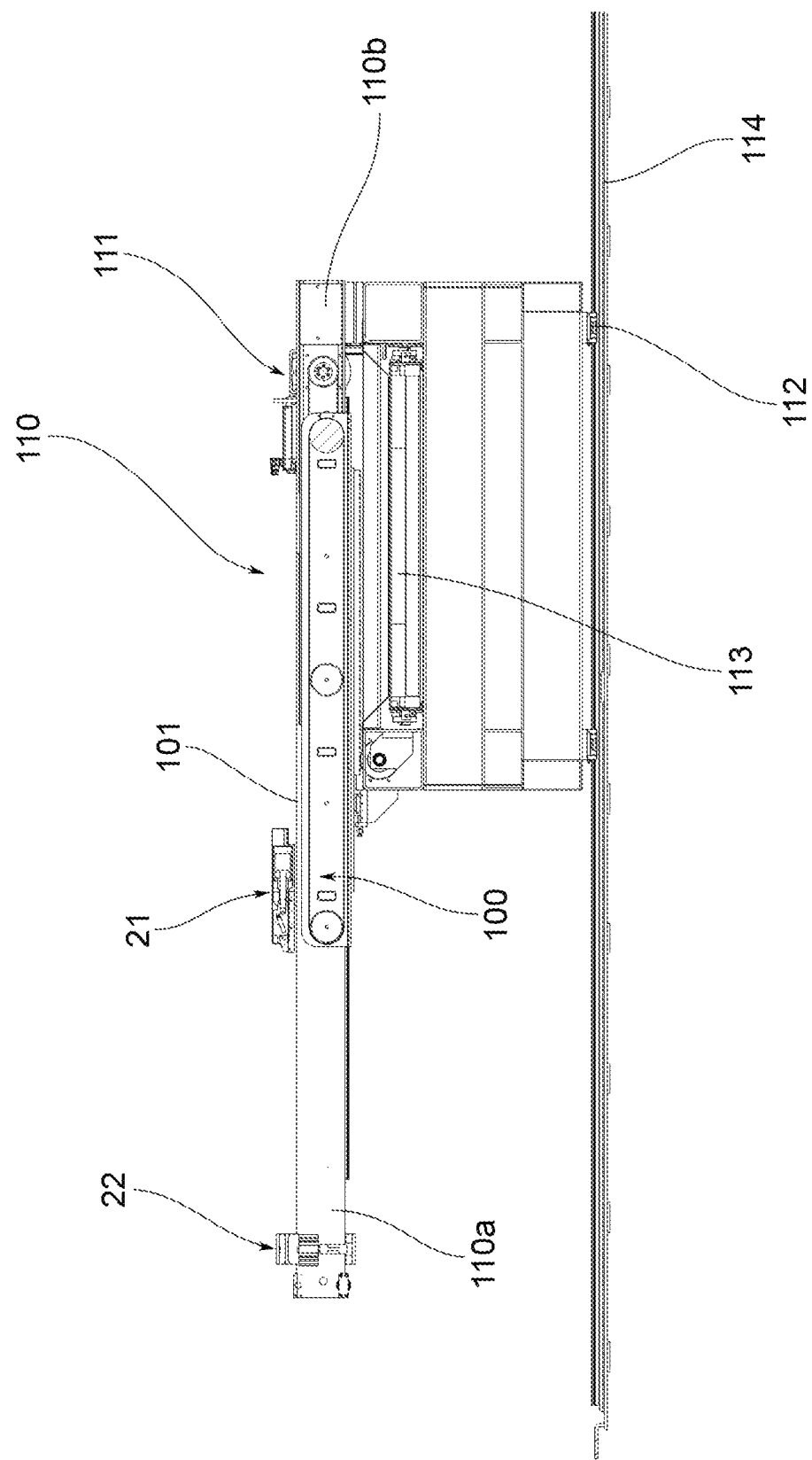
FIG. 12 shows a vertical sectional view of the device in FIG. 11 according to a vertical sectional centerline plane passing through the line XI-XI reported therein.
Figure 15:
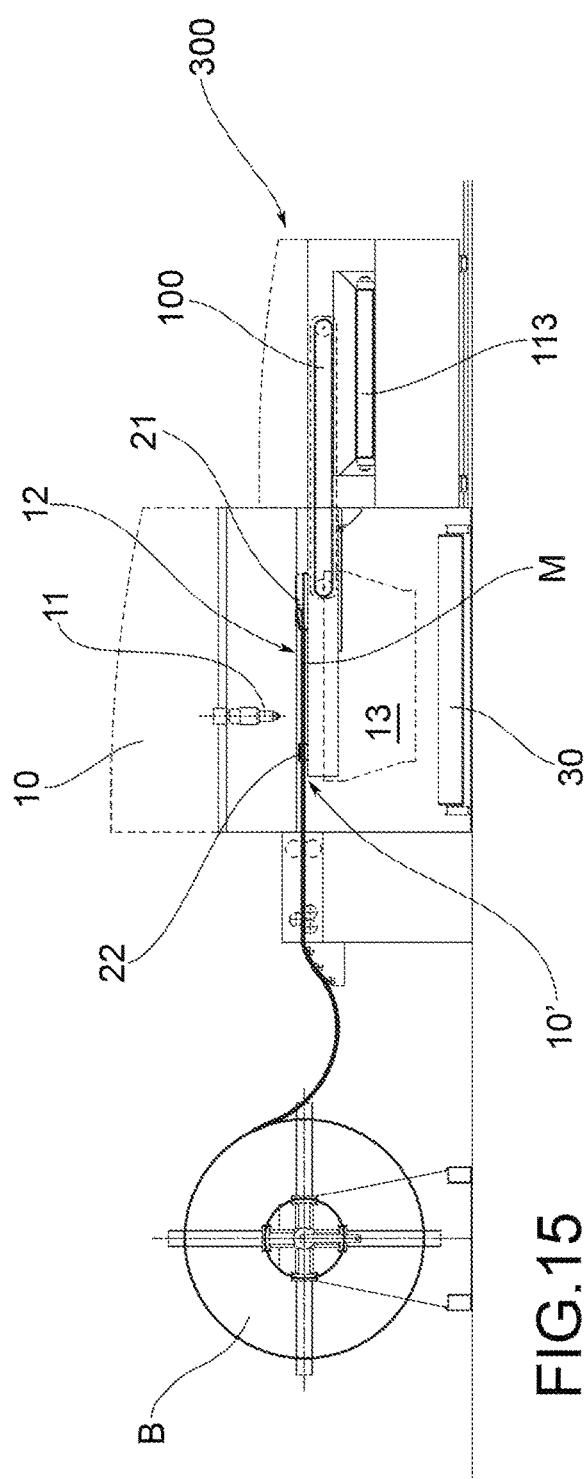
Figure 16:
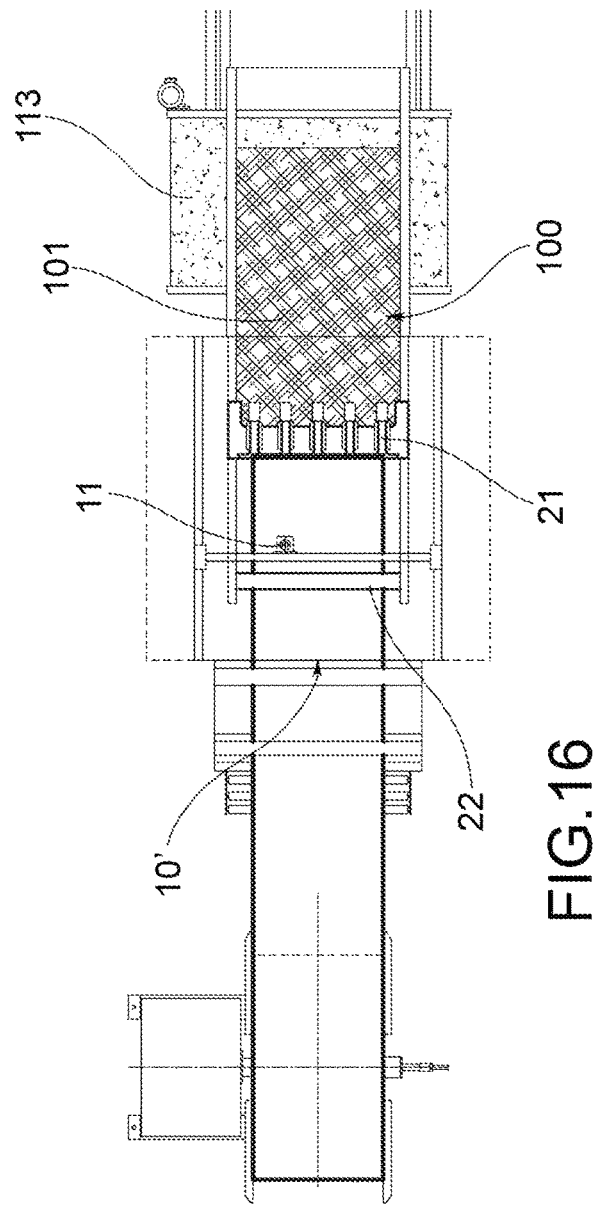
Figure 17:
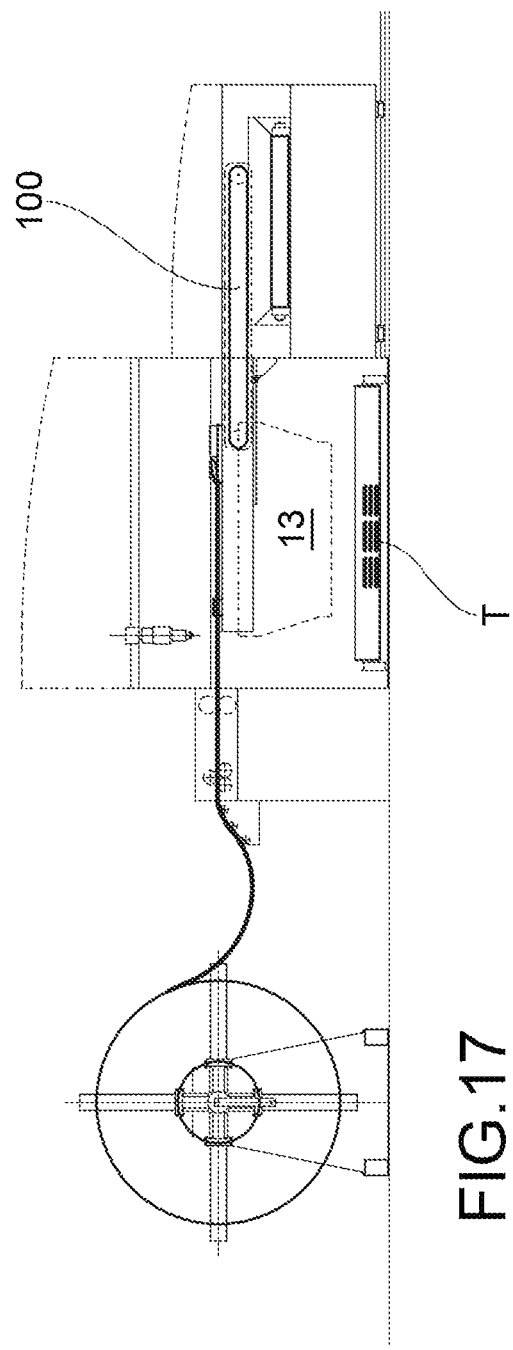
Figure 18:
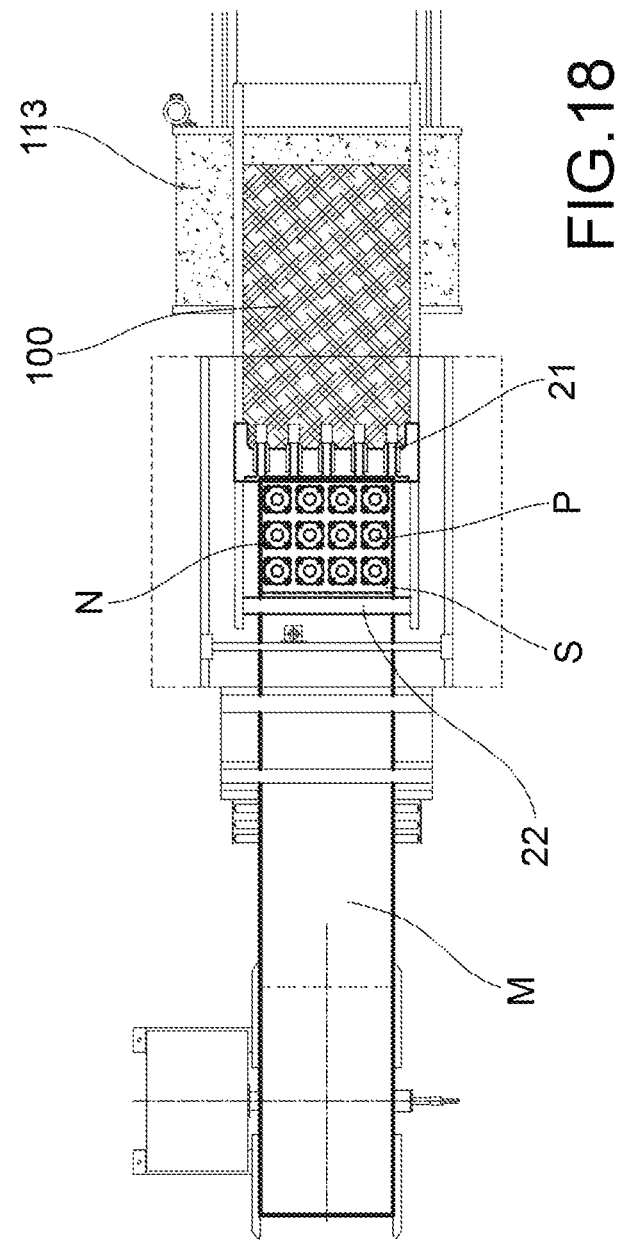

Operationally, as may be seen in particular from a comparison of FIGS. 6 and 8, such movable device 100 is movable below the cutting plane m and parallel to it between:

an active position, wherein the collection device 100 is positioned inside the operative cutting area 12 closing the receiving cavity 13, between the cutting plane m and the bottom of the receiving cavity 13; and a passive position, wherein the collection device 100 is positioned outside the operative cutting area 12 outside the receiving cavity 13.

The movable collection device 100 is illustrated in the active position in particular in FIGS. 5 and 6, FIGS. 13 and 14, FIGS. 19 and 20 and FIGS. 21 and 22.

The movable collection device 100 is illustrated in the passive position particularly in FIGS. 7 and 8, FIGS. 15 and 16 and FIGS. 17 and 18.

According to a further essential aspect of the present invention, the aforesaid electronic control unit 200 is programmed to control the displacement of the movable collection device 100 between the active and passive positions in coordination with the execution of the cutting operations, so that:

the movable collection device 100 is in the passive position when the cutting head 11 is executing cutting operations that generate swarf T, so that such swarf is free to fall by gravity into the receiving cavity 13; and the movable collection device 100 is instead in the active position when the cutting head 11 is executing cutting operations leading to the complete removal of the pieces P from the skeleton S, so that the pieces P are collected by the movable collection device 100 separately from the swarf T and from the skeleton S, which is held by the positioning means 21, 22 on the cutting plane m above the aforesaid movable collection device 100.

The present invention is thus based on:

programming the electronic control unit of the cutting apparatus in such a way that the cutting operations are separated into different phases, requiring that all the operations generating swarf T are carried out first and the operations leading to the complete detachment of the pieces P from the skeleton subsequently; and providing the apparatus with a movable device 100 for collecting the pieces P retractably insertable under the cutting plane m in the operative cutting area 12;

programming the electronic control unit so that the movement of the movable collection device 100 is coordinated in the cutting operations with the device and does not interfere with the fall of the swarf but rather intervenes to collect the pieces P; and keeping the skeleton S suspended on the cutting plane m at least during the collection of the pieces P.

Because of the invention, the apparatus 1 thus makes it possible to separate—directly in the operative cutting area—the machined pieces P from both the swarf T and the skeleton S.

Preferably, the movable device 100 for selective collection of machined pieces P is movable between the active position and the passive position, with a translation along the longitudinal advancing direction X of the material. The advantage of such preferred choice will be clarified in the following description.

According to a preferred embodiment of the invention, illustrated in the accompanying figures, the aforesaid movable device 100 consists of a first conveyor belt having an extension in length such as to protrude externally from the cutting station 10 when the movable device 100 is in the active position.

Operationally, as illustrated in particular in FIGS. 21 and 22, such first conveyor belt is operable in rotation to continuously extract from the operative cutting area 12 the machined pieces P that progressively fall thereon.

Preferably, as illustrated in the accompanying figures, the rotating belt of this first conveyor belt consists of a wire mesh or a perforated belt, suitable to define a continuous surface 101 for collecting the machined pieces P. Operationally, the mesh structure of the wire mesh or the perforation of the belt acts to vent the gases that are formed during laser or plasma cutting.

According to an alternative embodiment of the invention not illustrated in the accompanying figures, the aforesaid movable device 100 may consist of a removable collection tray or tank. As with the conveyor belt, the tray or tank is perforated to allow the gases formed during laser or plasma cutting to escape.

Preferably, the belt or tray is made of a metallic material in order to better withstand the action deriving from laser or plasma cutting.

In this regard, it should be noted that the apparatus 1 according to the invention allows the implementation of a series of operational measures aimed to reduce the action of the cutting head 11 on the movable device 100 (whether—as is preferable—a conveyor belt or a collection tray).

More specifically, it should first be noted that during all the cutting operations leading to the generation of swarf T, the movable collection device 100 is not subject to the action of the cutting head, being in the passive position.

On the other hand, the movable collection device 100 may be subject to the action of the cutting head 11 during cutting operations that lead to the complete detachment of the pieces P from the skeleton S, being, in this case, in the active position.

Preferably, in order to reduce the effects of the cutting head on the device 100, it is possible to envisage that the operations leading to the complete detachment of the pieces P from the skeleton S are in turn divided into two sub-steps, and the positioning of the movable device 100 is appropriately coordinated therewith.

More specifically, it may be envisaged:

a first sub-step wherein the pieces P are cut almost completely along their perimeter with respect to the skeleton S, with the exception of a few points which are left to form micro-joints N so as to prevent the pieces from detaching completely; and a second sub-step wherein the aforesaid micro-joints N are also cut, so as to allow the complete detachment of the pieces P from the skeleton S.

Operationally, during the first sub-step, which requires a very prolonged intervention of the cutting head, the movable device 100 may be left in the passive position, since the pieces P are not expected to be completely detached. During this first sub-step, the pieces P remain in effect attached to the skeleton S. In this way, the device 100 is protected from the action of the cutting head during the most intense intervention step.

During the second sub-step, which requires a less prolonged intervention of the cutting head, the movable device 100 is instead brought into the active position, the pieces P being intended to detach. During such second sub-step, the device 100 is in any case little subject to the action of the cutting head, this being limited to only cutting the micro-joints. In this way, the exposure of the device 100 is limited to the action of the cutting head during the less intense intervention step.

According to a preferred embodiment of the invention, the movable device 100 for selective collection of the pieces P is positioned in such a way that the continuous collection surface 101 defined thereby is near to the cutting plane m in order to minimize the distance H between the cutting plane m and continuous collection surface 101. In this way, the risk of deformations and/or abrasions of the machined pieces caused by the impact on the collection device 100 may be minimized.

Preferably, such distance H is between 2 and 20 cm, and even more preferably between 4 and 12 cm.

Because of the invention, the apparatus 1 thus makes it possible to combine the separation of the machined pieces from the swarf and from the skeleton directly in the cutting area with a mode for collecting the machined pieces that minimizes the risk of deformations and/or abrasions of the same machined pieces.

This is made possible by the fact that it is not necessary, in performing cutting operations, to support the laminar material from below in the operative cutting area 12. The space immediately below the cutting plane m is therefore free and may be freely engaged by the movable device 100 without limitations.

Advantageously, as shown in the accompanying figures, the movable device 100 for selective collection of machined pieces P is guided in movement between the active and passive position by a support structure 110. The apparatus 1 comprises motorized means 111 for moving the movable device 100 between the two positions, active and passive.

In particular, as illustrated in the accompanying figures, the motorized vehicles 111 may include a chain or rack-and-pinion transmission system which engages the supports of the rotating belt of the conveyor belt.

Advantageously, the support structure 110 that supports and guides the movable device 100 comprises a coupling portion 110a that extends parallel to the longitudinal advancing direction X of the material within the receiving cavity 13 and has a transverse footprint limited to a peripheral part of such receiving cavity 13. This is to prevent the coupling portion 110a of the support structure 110 from interfering with the falling of the swarf T into the receiving cavity 13.

The function of the coupling portion 110a is to support the movable device 100 within the receiving cavity 13.

According to the preferred embodiment of the invention, the aforesaid support structure 110 with the associated movable device 100 for selective collection of the machined pieces P and the relative motorized means 111 is separable from the cutting station 10.

Preferably, as shown in the accompanying figures, this support structure 110 is equipped with a carriage 112 which, in particular, is slidingly guided by a rail 114 in its movement of coupling and uncoupling with the cutting station 10.

Preferably, the support structure of the aforesaid positioning means 21, 22 coincides with the support structure 110 to which is slidingly connected the movable collection device 100 for selective collection of the machined pieces P, and in particular, with the coupling portion 110a.

In accordance with the preferred embodiment as illustrated in the accompanying figures, the aforesaid positioning means 21, 22 form, together with the movable device 100 for selective collection of machined pieces P and the relative support structure 110, an operative unit 300, which may be separated from the cutting station 10.

The aforesaid coupling portion 110a extends cantilevered from a main portion 110b of the support structure 110. In particular, the carriage 112 is associated with the main portion 110b of the support structure 110.

The cutting station 10 has an external opening 14 for inserting the coupling portion 110a into the receiving cavity 13. As already mentioned, such coupling portion 110a supports both the positioning means 21, 22 and the movable device 100 for selective collection of the pieces P.

Operationally, due to the fact that the positioning means 21, 22, the movable device 100 for selective collection of the machined pieces P and the support structure 110 thereof form an operative unit 300, separable from the cutting station 10, a cutting station equipped with a spike bed conveyor may be used as a cutting station. The conversion of such cutting station for use in apparatus 1 according to the invention is easy. In fact, it is sufficient to disassemble the spike bed conveyor and associate the operative unit 300 thereto. If one intends to return to using the cutting station in the mode with spike bed conveyor, it is sufficient to separate the operative unit 300 from the cutting station and return the spike bed conveyor thereto.

The spike bed conveyor is easy to assemble and disassemble. It is, in effect, sufficient to remove the transverse bars that form the rotating belt and define the cutting plane on which the laminar material must rest. The moving means of the bars may be kept in the cutting station as they do not occupy the space relative to the receiving cavity 13. In the accompanying figures the moving components of the spike bed conveyor (which are kept in the cutting station 10) are indicated with F.

Advantageously, as illustrated in the accompanying figures, the apparatus 1 comprises a second conveyor belt 113 able to receive the machined pieces P collected by the first conveyor belt, which constitutes the aforesaid movable selective collection device 100. Such second conveyor belt 113 is positioned outside the cutting station 10 at a height lower than that of the first conveyor belt 100.

Preferably, the aforesaid second conveyor belt 113 is associated with said separable operative unit 300.

Alternatively, the second conveyor belt may be replaced by a removable tray or tank.

Advantageously, the apparatus 1 comprises a collection tank 30 for the swarf T, located at the bottom of the receiving cavity 13. Such collection tank 30 may be removed from the cutting station 10 for emptying. Preferably, such collection tank 30 is extractable in a direction Y transverse to the longitudinal advancing direction X of the material.

As an alternative to the collection tank 30 for the swarf T, the apparatus 1 may comprise a third conveyor belt located at the bottom of the receiving cavity 13. Such third conveyor belt may be operated in rotation to continuously extract from the bottom of the receiving cavity 13 the swarf T that progressively falls thereon.

Preferably, such third conveyor belt is oriented with its movement axis Y transverse to the longitudinal advancing direction X of the material.

There are multiple modes for removing the skeleton S from the operative cutting area 12.

According to a first particular embodiment of the invention (not illustrated in the accompanying figures), the apparatus 1 may comprise, downstream of the cutting station 10 along the longitudinal advancing direction X of the material, means for rewinding onto coil the skeleton S of the laminar material exiting the operative cutting area 12. The logic control unit 200 is programmed to manage cutting operations such that, after the cutting operations leading to the complete detachment of the pieces P from the skeleton S have been completed, the aforesaid rewinding means are temporarily activated to rewind the skeleton S back onto the coil, extracting it from the operative cutting area 12. In this way, a new portion of the laminar material is positioned in the operative cutting area 12 to be stretched by the action of the positioning means 21, 22, already described.

According to a second particular embodiment of the invention (not illustrated in the accompanying figures), the aforesaid logic control unit 200 is programmed to manage the cutting operations in such a way that, once the pieces P have been collected from the movable device 100, the aforesaid movable device 100 for selective collection of the pieces P is returned to the passive position and the skeleton S is separated by transverse cutting from the rest of the not yet machined laminar material in the operative cutting area 12 and let to fall into the receiving cavity 13, where it is collected together with the swarf T. In this case, advantageously, the apparatus 1 is not equipped with coil rewinding means for the skeleton S of the machined laminar material exiting the operative cutting area 12.

According to a third particular embodiment of the invention (shown in FIGS. 13 to 26), the aforesaid logic control unit 200 is programmed to manage the cutting operations in such a way that, after having cleared the movable selective collection device 100 from the machined pieces P collected from the operative cutting area 12, such movable device 100 is kept in or brought back to the active position, and the skeleton S is separated by transverse cutting from the rest of not yet machined material in the operative cutting area 12 and let to fall onto the movable device 100 to be extracted by means of the same from the operative cutting area 12. Preferably, in this case the movable collection device 100 consists of a first conveyor belt, so that it may be cleared automatically, both from the pieces P and from the skeleton S at different times.

With reference to FIGS. 13 to 26, the operation of the apparatus 1 will now be described, in the specific case wherein the movable device 100 for selective collection of the pieces P consists of a conveyor belt and such movable device is also used for the removal of the skeleton S.

A head portion of the laminar material M wound in coil is initially inserted through the entrance 10' into the cutting station 10 until it reaches the operative cutting area 11. In such position, it is engaged by the positioning means 21, 22 (see FIGS. 13-14).

The movable gripping device 21 slides along the axis X and drags the laminar material portion into the operative area 12. When the sliding is complete, the fixed reversible blocking device 22 blocks the laminar material, allowing the movable gripping device to tension it (see FIGS. 15-16).

The movable selective collection device is moved into the passive position. The cutting operations that generate the formation of swarf are carried out. The swarf falls inside the receiving cavity 13 at the bottom of which it is collected inside a collecting tank 30 (see FIGS. 17-18). In this step, the cutting operations of the pieces may also be carried out, leaving micro-joints between the pieces P and the skeleton S.

Figure 19:
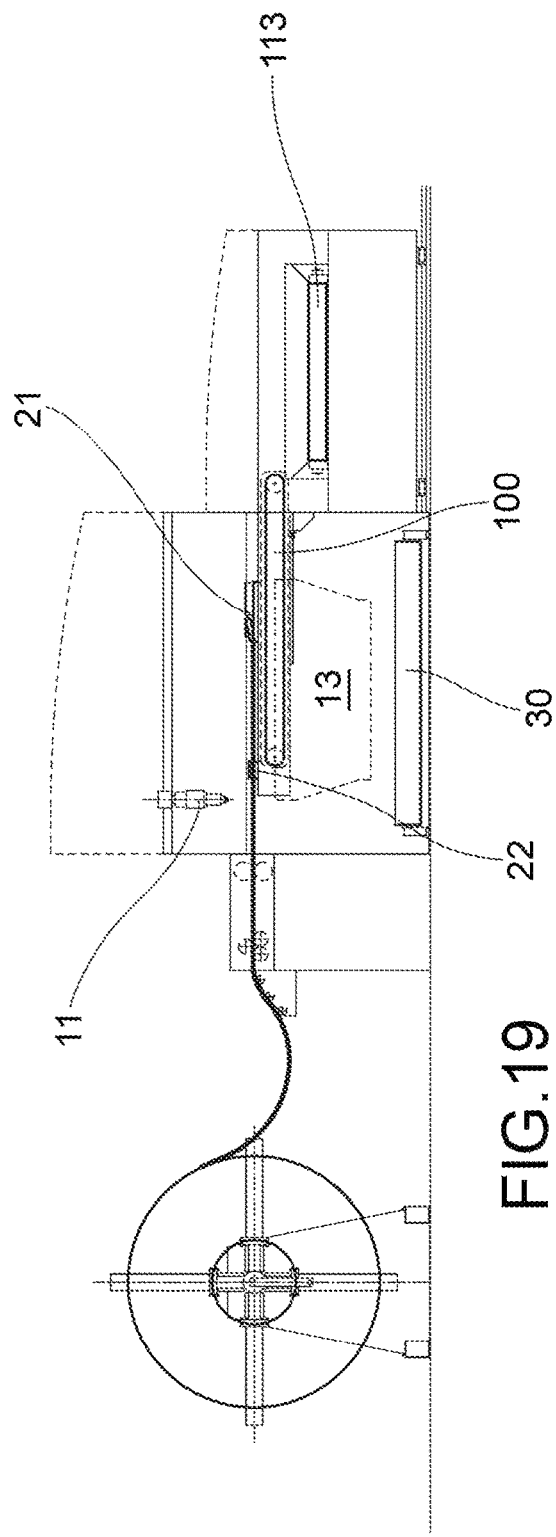
Figure 20:
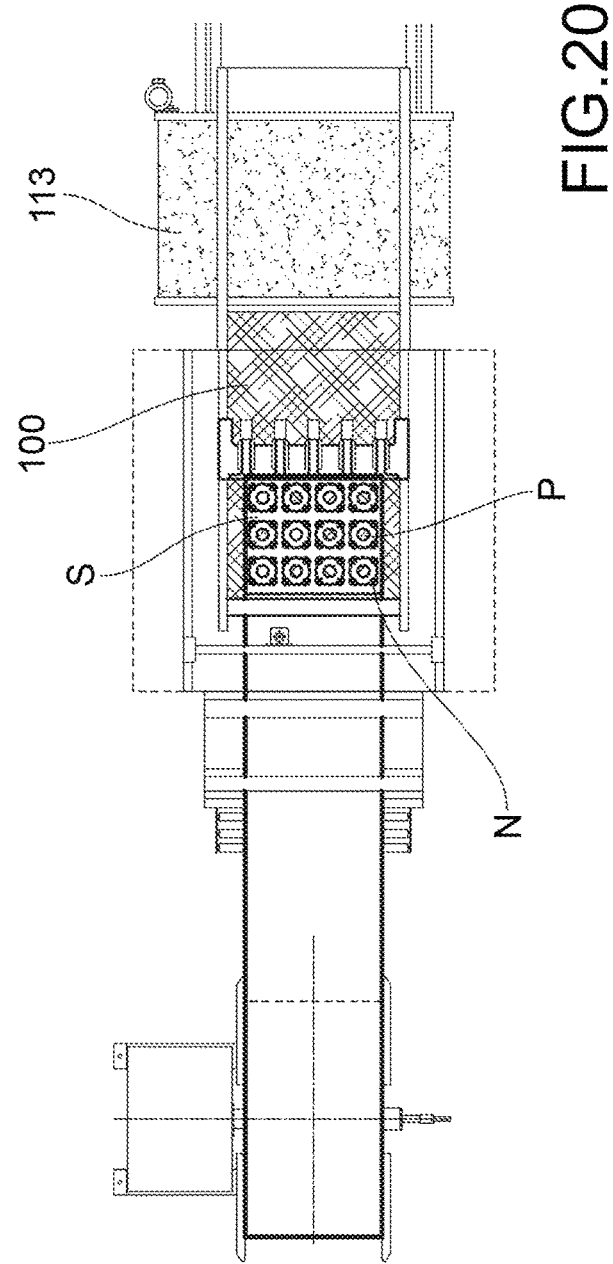
Figure 23:
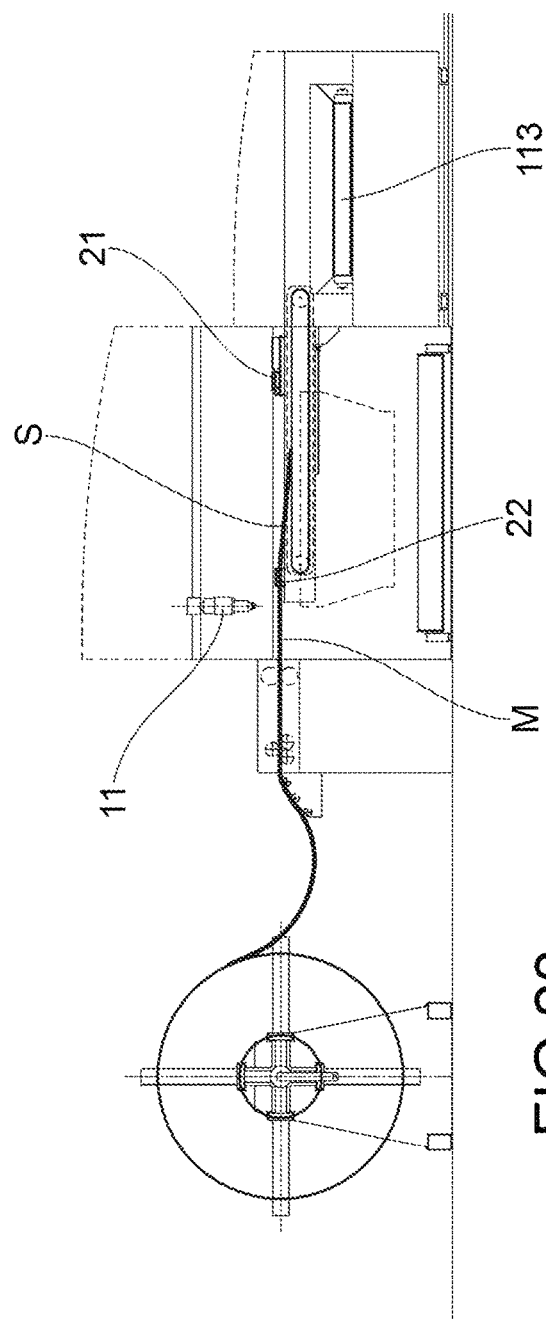
Figure 24:
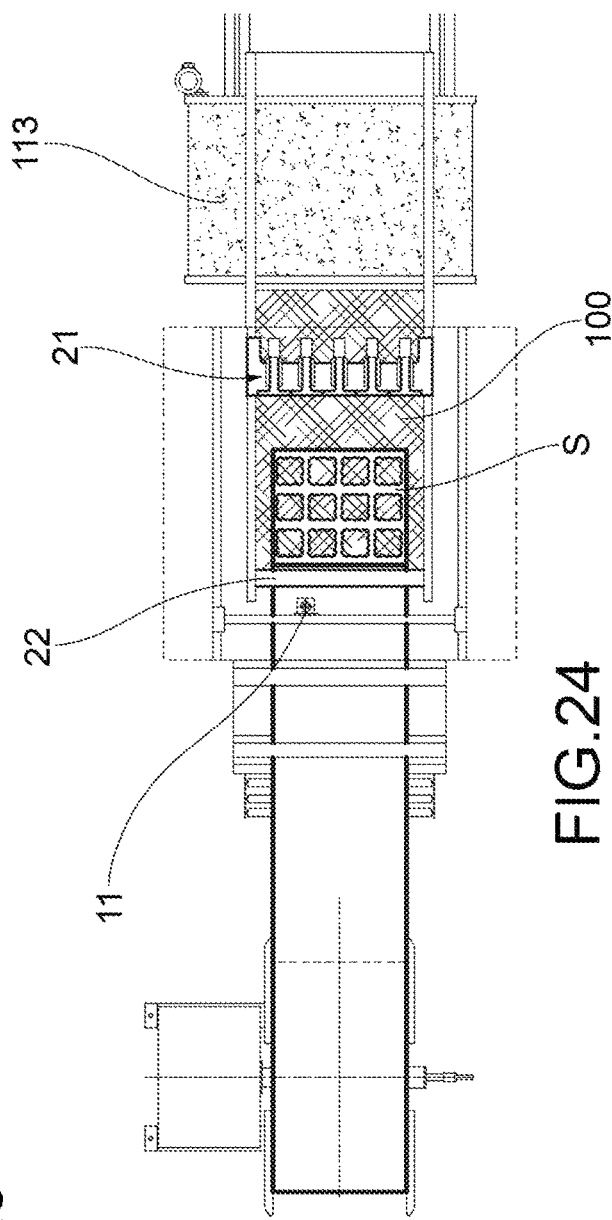

The movable selective collection device is moved into the active position (see FIGS. 19-20).

Cutting operations are carried out that lead to the complete detachment of the pieces P from the skeleton S. The pieces P fall onto the movable selective collection device 100 consisting of a conveyor belt and are progressively transferred from the latter to the outside of the cutting station 10 (see FIGS. 21-22).

The movable collection device 100 is cleared from the pieces P and maintained in the active position. The skeleton S is detached from the rest of the laminar material by a transverse cut; disengaged from the positioning means 21, 22, it is let to deposit itself on the movable device 100 (see FIGS. 23-24).

Figure 25:
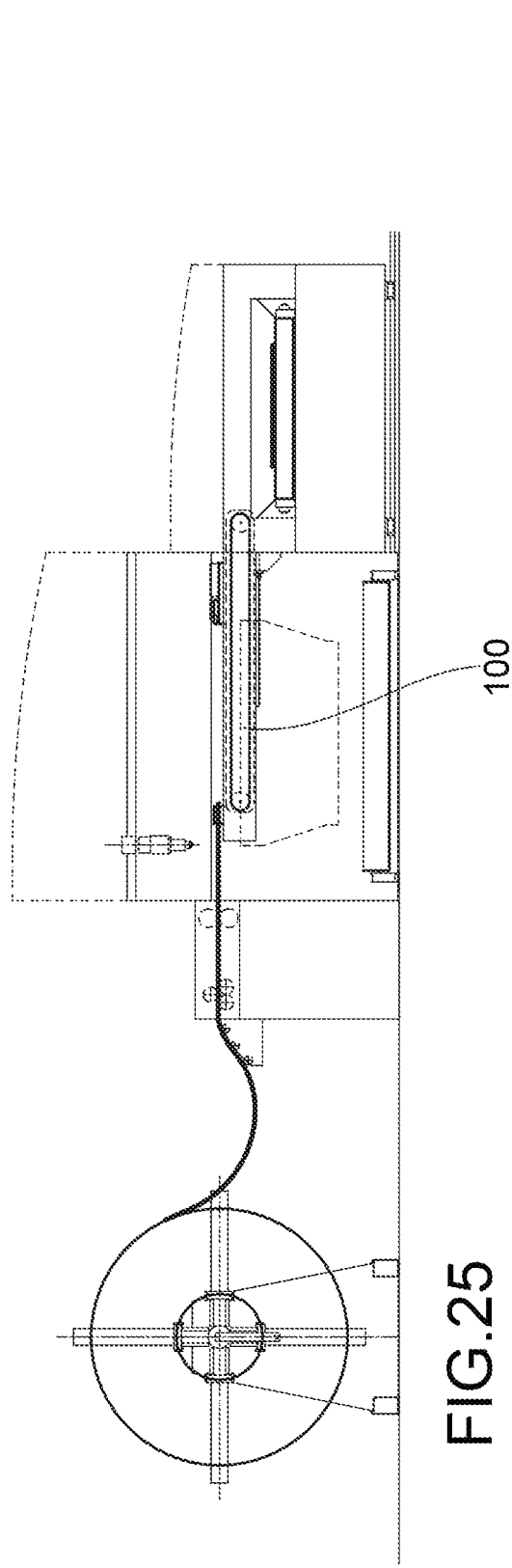
Figure 26:
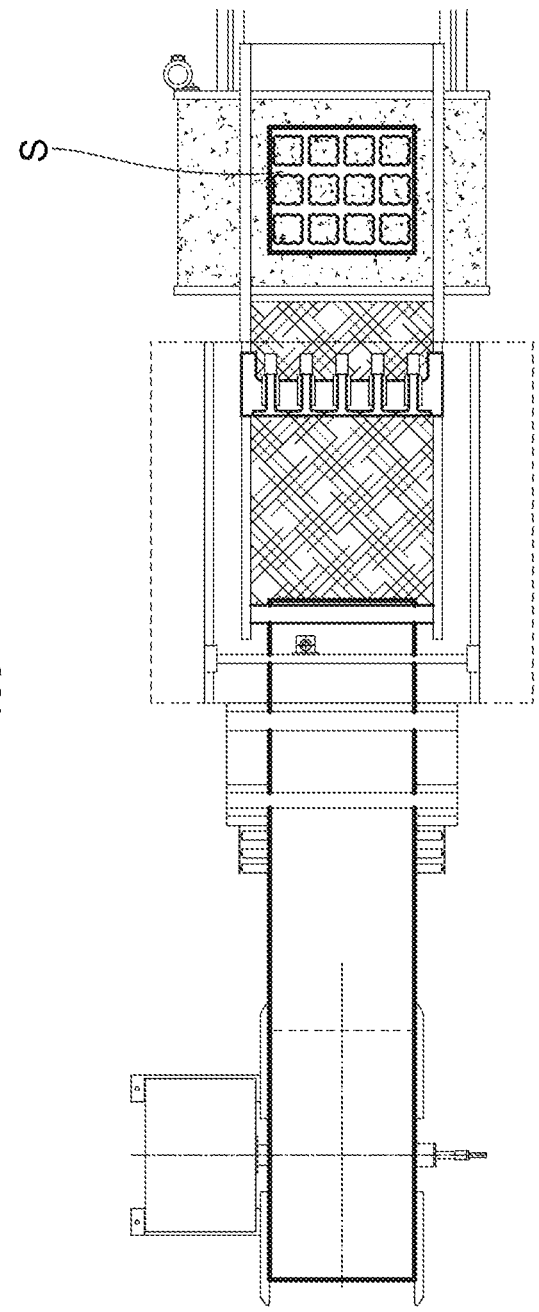

The skeleton S is then removed from the cutting area 12 using the movable device 100 and collected separately from the pieces P (see FIGS. 25-26).

The cycle may now be resumed from the beginning.

The method for laser or plasma cutting of pieces from laminar material wound in coil according to the invention will now be described.

The method according to the invention comprises the following operational steps:

a) providing a cutting machine 1 according to the invention, in particular, as described previously;

b) positioning, in the operative cutting area 12, a portion of the laminar material M on the cutting plane m through the entrance 10' of the cutting station 10;

c) keeping the portion of laminar material M blocked on said cutting plane m during the cutting operations, suspended in the air, and longitudinally stretched over the receiving cavity 13;

d) bringing said movable device 100 for selective collection of machined pieces P into the passive position;

e) performing on the portion of laminar material a first phase of cutting operations which generates swarf T, letting such swarf T fall by gravity into the receiving cavity 13;

f) bringing the movable device 100 for selective collection of machined pieces P into the active position;

g) performing on the portion of laminar material a second phase of cutting operations leading to the complete detachment of the pieces P from the skeleton S;

h) collecting the pieces P that detach from the laminar material onto the movable device 100 underneath, preventing them from falling into the receiving cavity 13 together with the swarf; and i) removing from the operative cutting area 12 the skeleton of the portion of the laminar material separately from the machined pieces P.

The pieces P may be extracted continuously from the movable collection device 100 in the case wherein it is constituted by a conveyor belt, or discontinuously if it is constituted by a collection tray.

As already mentioned, when describing the apparatus according to the invention, there are multiple modes for carrying out step i) of removing the skeleton S.

In accordance with a first mode, step i) of removing the skeleton from the operative cutting area 12 is carried out by making the skeleton S to slide onto the cutting plane m via the means for rewinding onto the coil the already machined laminar material placed downstream of the cutting station 10.

In accordance with a second mode, alternative to the first, step i) of removing the skeleton from the operative cutting area 12 is carried out by making the skeleton S of the portion of machined laminar material to fall into the receiving cavity 13, directly detaching the skeleton S in the operative cutting area 12 by transverse cutting from the rest of the laminar material not yet machined.

According to a third mode, alternative to the first and second modes, before step i) of removing the skeleton S, a step 1) of picking up the machined pieces P from the movable collection device 100 is carried out (preferably continuously, in the case wherein the device 100 is constituted by a conveyor belt). Step i) of removing the skeleton from the operative cutting area 12 is carried out using the movable collection device 100 (cleared from the pieces P), proceeding thus to detach the skeleton directly in the cutting area 12 by transverse cutting from the rest of the laminar material not yet machined, letting it to deposit onto the movable collection device 100.

The advantages offered by the invention already highlighted above when describing the apparatus 1 also apply to the cutting method and will not be repeated here for brevity of exposition.

The invention allows many advantages already partly described to be obtained.

The apparatus and method for laser or plasma cutting of pieces from laminar material wound in coil according to the invention make it possible to separate the machined pieces both from the swarf and from the skeleton directly in the cutting area.

In the preferred case wherein the movable device for selective collection of the pieces is placed just below the cutting plane m, the apparatus and the method for laser or plasma cutting of pieces from laminar material wound in coil according to the invention also allow one to combine the separation of the machined pieces from the swarf and from the skeleton directly in the cutting area with a mode for collecting the machined pieces that minimizes the risk of deformations and/or abrasions of the same machined pieces.

The apparatus according to the invention is simple to manage, requiring only a coordination between the cutting operations and the movements of the movable collection device.

Finally, the apparatus according to the invention is simple and economical to manufacture, since it does not require the installation of particularly complex systems.

The invention thus conceived therefore achieves the foregoing objects.

Obviously, in its practical implementation, it may also be assumed to take on embodiments and configurations other than those described above without, for this reason, departing from the present scope of protection.

Moreover, all details may be replaced by technically equivalent elements, and the dimensions, shapes and materials used may be of any kind according to the need.

The invention claimed is:

1. An apparatus for laser or plasma cutting of pieces from laminar material wound in coil, comprising:
   a cutting station, provided with at least one laser or plasma cutting head movable within an operative cutting area, which is placed downstream of an entrance of the laminar material in said station along a longitudinal advancing direction of said material and is made above a receiving cavity of a cutting swarf of a laminar material;
   means for positioning a portion of said laminar material in said operating area on a cuttingplane placed on top of said receiving cavity, wherein said positioning means are suitable to maintain said portion of laminar material blocked on said cutting plane during cutting operations, suspended in the air and longitudinally stretched over said receiving cavity; and
   an electronic control unit in charge of controlling the operation of said apparatus; and
   at least one movable collection device for selective collection of machined pieces, wherein said movable collection device defines a continuous collection surface and is movable under the cutting plane and parallel to said cutting plane between an active position, wherein said movable collection device is positioned inside said operative cutting area closing the receiving cavity between the cutting plane and the bottom of said cavity, and a passive position, wherein said movable collection device is positioned outside said operative cutting area outside the receiving cavity, and wherein said electronic control unit is programmed to control the movement of said movable collection device between said active position and said passive position in coordination with the execution of the cutting operations, in such a way that that said movable collection device is in the passive position when the cutting head is performing cutting operations that generate swarf, in order to leave said swarf free to fall by gravity inside the receiving cavity, and said movable collection device is instead in the active position, when the cutting head is performing cutting operations which lead to the complete detachment of the pieces from pieces skeleton so that the pieces are collected by the movable collection device separately from the swarf and from the skeleton, which is retained by positioning means on the cutting plane above said movable collection device, and
   wherein said movable collection device consists of a first conveyor belt, having an extension in length such as to project outwards from said cutting station when the movable collection device is in said active position, wherein said first conveyor belt may be operated in rotation to continuously extract from the operative cutting area the machined pieces that progressively fall on it.

2. The apparatus according to claim 1, wherein said movable collection device for selective collection of machined pieces is movable between said active position and said passive position, with a translation along said longitudinal advancing direction of the material.

3. The apparatus according to claim 1, wherein the rotating belt of said first conveyor belt consists of a metallic wire net or a perforated belt, suitable to define a continuous surface for the collection of the machined pieces.

4. The apparatus according to claim 1, wherein said movable collection device consists of a tray or a removable collection tank.

5. The apparatus according to claim 1, wherein said movable collection device is positioned so that the continuous collection surface defined by said movable collection device is located near the cutting plane so as to minimize the distance between the cutting plane and the continuous collection surface.

6. The apparatus according to claim 5, wherein said movable collection device is positioned so that the continuous collection surface defined by said movable collection device is located near the cutting plane so as to minimize the distance between the cutting plane and the continuous collection surface, said distance being between 2 cm and 20 cm.

7. The apparatus according to claim 5, wherein said movable collection device is positioned so that the continuous collection surface defined by said movable collection device is located near the cutting plane so as to minimize the distance between the cutting plane and the continuous collection surface, said distance being between 4 cm and 12 cm.

8. The apparatus according to claim 1, wherein the movable selective collection device of machined pieces is guided by a support structure in the movement between said active position and said passive position and wherein said apparatus comprises a motor for moving said movable collection device between said active and passive positions.

9. The apparatus according to claim 8, wherein said support structure with the associated movable collection device for selective collection of the machined pieces and related motor is separable from the cutting station.

10. The apparatus according to claim 8, wherein said support structure comprises a coupling portion which extends parallel to said longitudinal advancing direction of the material inside said receiving cavity and has a transverse size limited to a peripheral part of said receiving cavity.

11. The apparatus according to claim 1, wherein said positioning means comprise:
    a first support structure guiding the selective movable collection device in the movement between said active position and said passive position;
    a second support structure,
    a movable gripping device, which is susceptible of acting in gripping on a transverse portion of the laminar material and is movable with respect to said second support structure parallel to said longitudinal advancing direction of said material to drag at least a portion of the laminar material from the entrance inside the operative cutting area on the cutting plane; and
    a fixed reversible blocking device, which is associated with said second support structure to act transversely near the entrance on the part of laminar material placed there, said reversible blocking device being operable in blocking in conjunction with said movable gripping device to longitudinally stretch the portion of laminar material dragged by the movable gripping device inside the operating area.

12. The apparatus according to claim 11, wherein said movable gripping device consists of at least a vice slidingly guided by the second support structure along the longitudinal direction and wherein said fixed reversible blocking device consists of at least one fixed vice.

13. The apparatus according to claim 11, wherein the movable selective movable collection device of machined pieces is guided by a first support structure in the movement between said active position and said passive position and wherein said apparatus comprises a motor for moving said movable collection device between said active and passive positions, wherein said first support structure comprises a coupling portion which extends parallel to said longitudinal advancing direction of the material inside said receiving cavity and has a transverse size limited to a peripheral part of said receiving cavity; and wherein the second support structure of said positioning means coincides with the first support structure to which said movable collection device for selective collection of the machined pieces is slidingly connected.

14. The apparatus according to claim 13, wherein said first support structure with the associated movable collection device for selective collection of the machined pieces and related motor is separable from the cutting station, preferably said first support structure being provided with a carriage; and wherein said positioning means form, with the device for selective collection of machined pieces and with the relative first support structure, an operating unit separable from said cutting station and wherein said coupling portion extends cantilevered from a main portion of the first support structure, said cutting station being equipped with an external opening for the insertion of said coupling portion inside said receiving cavity.

15. The apparatus according to claim 14, wherein said movable collection device consists of a first conveyor belt, having an extension in length such as to project outwards from said cutting station when the movable collection device is in said active position, wherein said first conveyor belt may be operated in rotation to continuously extract from the operative cutting area the machined pieces that progressively fall on it;

wherein the apparatus further comprises a second conveyor belt suitable to receive the machined pieces collected by the first conveyor belt which constitutes said movable selective movable collection device, wherein said second conveyor belt is placed externally to said cutting station at a lower height than said first conveyor belt; and wherein said second conveyor belt is associated with said separable unit.

16. The apparatus according to claim 1, comprising a second conveyor belt suitable to receive the machined pieces collected by the first conveyor belt which constitutes said movable selective movable collection device, wherein said second conveyor belt is placed externally to said cutting station at a lower height than said first conveyor belt.

17. The apparatus according to claim 16, comprising a third conveyor belt placed on the bottom of the receiving cavity operable in rotation to continuously extract from the bottom of the receiving cavity the swarf gradually falling on said receiving cavity.

18. The apparatus according to claim 1, comprising a collection tank for the swarf, placed on the bottom of the receiving cavity, said collection tank being extractable from the cutting station.

19. The apparatus according to claim 1, comprising upstream of the entrance to the cutting station means of guiding and straightening on the cutting plane the laminar material coming from a coil in the longitudinal advancing direction of the material.

20. The apparatus according to claim 1, comprising downstream of the cutting station in the longitudinal advancing direction of the material means for rewinding onto coil the skeleton of the machined laminar material exiting the operative cutting area, wherein said control unit is programmed to manage the cutting operations in such a way that, at the end of the cutting operation leading to the complete detachment of the pieces from the skeleton, said rewinding means are temporarily activated to rewind onto coil the skeleton, removing the skeleton from the operative cutting area.

21. The apparatus according to claim 1, wherein said control unit is programmed to manage the cutting operations in such a way that, once the pieces have been collected from the movable collection device, said movable collection device is brought back to the passive position and the skeleton is separated in the operative cutting area by transverse cutting from the rest of the laminar material not yet machined and allowed to fall into the receiving cavity.

22. The apparatus according to claim 1, wherein said control unit is programmed to manage the cutting operations in such a way that, after having freed the movable collection device from the machined pieces collected in the operative cutting area, said movable collection device is kept or brought back to the active position and the skeleton is separated in the operative cutting area by transverse cutting from the rest of the material not yet machined and allowed to fall onto the movable collection device to be extracted thereby from the operative cutting area.

23. A method for the laser or plasma cutting of pieces from laminar material wound in coil, comprising the following operating steps:

a) providing a cutting apparatus according to claim 1;
    b) positioning in said operative cutting area a portion of the laminar material on the cutting plane through the entrance of the cutting station;
    c) keeping said portion of laminar material blocked on said cutting plane during the cutting operations, suspended in the air and longitudinally stretched over said receiving cavity;
    d) bringing said movable collection device for selective collection of machined pieces into the passive position;
    e) performing on said portion of laminar material a first phase of cutting operations which generates swarf letting such swarf fall by gravity inside the receiving cavity;
    f) bringing said movable collection device for selective collection of machined pieces into the active position;
    g) performing on said portion of laminar material a second phase of cutting operations leading to the complete detachment of the pieces from the skeleton;
    h) collecting the pieces detaching themselves from the laminar material on the movable collection device underneath, preventing them from falling into the receiving cavity together with the swarf; and
    i) removing from the operative cutting area the skeleton of said portion of laminar material separately from the machined pieces.

24. The method according to claim 23, wherein said step of removing the skeleton from the operative cutting area is performed by making the skeleton to slide on the cutting plane through means for coil rewinding the laminar material already machined, placed downstream of the cutting station.

25. The method according to claim 23, wherein said step of removing the skeleton from the operative cutting area is performed by making the skeleton of the portion of machined laminar material to fall into the receiving cavity, directly detaching the skeleton in the operative cutting area by transverse cutting from the rest of the laminar material not yet machined.

26. The method according to claim 23, wherein before the step of removing the skeleton from the operative cutting area, an additional step of picking up the machined pieces from said movable collection device is conducted and wherein said step of removing the skeleton from the operative cutting area is performed using the movable collection device, thereby proceeding to directly detach the skeleton in the cutting area by transverse cutting from the rest of the laminar material not yet machined, allowing it the skeleton to fall onto the movable collection device.

27. An apparatus for laser or plasma cutting of pieces from laminar material wound in coil, comprising:
- a cutting station, provided with at least one laser or plasma cutting head movable within an operative cutting area, which is placed downstream of an entrance of the laminar material in said station along a longitudinal advancing direction of said material and is made above a receiving cavity of the cutting swarf of the laminar material;
- means for positioning a portion of said laminar material in said operating area on a cuttingplane placed on top of said receiving cavity, wherein said positioning means are suitable to maintain said portion of laminar material blocked on said cutting plane during the cutting operations, suspended in the air and longitudinally stretched over said receiving cavity; and
- an electronic control unit in charge of controlling the operation of said apparatus; and
- at least one movable collection device for selective collection of the machined pieces, wherein said movable collection device defines a continuous collection surface and is movable under the cutting plane and parallel to said cutting plane between an active position, wherein said movable collection device is positioned inside said operative cutting area closing the receiving cavity between the cutting plane and the bottom of said cavity, and a passive position, wherein said movable collection device is positioned outside said operative cutting area outside the receiving cavity,
- and wherein said electronic control unit is programmed to control the movement of said movable collection device between said active position and said passive position in coordination with the execution of the cutting operations, in such a way that that said movable collection device is in the passive position when the cutting head is performing cutting operations that generate swarf, in order to leave said swarf free to fall by gravity inside the receiving cavity, and said movable collection device is instead in the active position, when the cutting head is performing cutting operations which lead to the complete detachment of the pieces from the skeleton so that the pieces are collected by the movable collection device separately from the swarf and from the skeleton, which is retained by positioning means on the cutting plane above said movable collection device, wherein said positioning means comprise:
- a support structure,
- a movable gripping device, which is susceptible of acting in gripping on a transverse portion of the laminar material and is movable with respect to said support structure parallel to said longitudinal advancing direction of said material to drag at least a portion of the laminar material from the entrance inside the operative cutting area on the cutting plane; and
- a fixed reversible blocking device, which is associated with said support structure to act transversely near the entrance on the part of laminar material placed there, said reversible blocking device being operable in blocking in conjunction with said movable gripping device to longitudinally stretch the portion of laminar material dragged by the movable gripping device inside the operating area.

28. An apparatus for laser or plasma cutting of pieces from laminar material wound in coil, comprising:
- a cutting station, provided with at least one laser or plasma cutting head movable within an operative cutting area, which is placed downstream of an entrance of the laminar material in said station along a longitudinal advancing direction of said material and is made above a receiving cavity of the cutting swarf of the laminar material;
- means for positioning a portion of said laminar material in said operating area on a cuttingplane placed on top of said receiving cavity, wherein said positioning means are suitable to maintain said portion of laminar material blocked on said cutting plane during the cutting operations, suspended in the air and longitudinally stretched over said receiving cavity; and
- an electronic control unit in charge of controlling the operation of said apparatus; and
- at least one movable collection device for selective collection of the machined pieces, wherein said movable collection device defines a continuous collection surface and is movable under the cutting plane and parallel to said cutting plane between an active position, wherein said movable collection device is positioned inside said operative cutting area closing the receiving cavity between the cutting plane and the bottom of said cavity, and a passive position, wherein said movable collection device is positioned outside said operative cutting area outside the receiving cavity,
- and wherein said electronic control unit is programmed to control the movement of said movable collection device between said active position and said passive position in coordination with the execution of the cutting operations, in such a way that that said movable collection device is in the passive position when the cutting head is performing cutting operations that generate swarf, in order to leave said swarf free to fall by gravity inside the receiving cavity, and said movable collection device is instead in the active position, when the cutting head is performing cutting operations which lead to the complete detachment of the pieces from the skeleton so that the pieces are collected by the movable collection device separately from the swarf and from the skeleton, which is retained by positioning means on the cutting plane above said movable collection device, wherein the movable selective collection device of machined pieces is guided by a support structure in the movement between said active position and said passive position and wherein said apparatus comprises a motor for moving said movable collection device between said active and passive positions; and
- wherein said support structure comprises a coupling portion which extends parallel to said longitudinal advancing direction of the material inside said receiving cavity and has a transverse size limited to a peripheral part of said receiving cavity.

* * * * *